US012659381B2

(12) United States Patent
Zhao et al.

(10) Patent No.: US 12,659,381 B2
(45) Date of Patent: Jun. 16, 2026

(54) METHOD AND APPARATUS FOR DISCOVERING EDGE APPLICATION SERVER

(71) Applicant: HUAWEI TECHNOLOGIES CO., LTD., Shenzhen (CN)

(72) Inventors: Pengtao Zhao, Shenzhen (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 18/424,897

(22) Filed: Jan. 29, 2024

(65) Prior Publication Data

US 2024/0171647 A1 May 23, 2024

Related U.S. Application Data

(63) Continuation of application No. PCT/CN2022/106229, filed on Jul. 18, 2022.

(30) Foreign Application Priority Data

Aug. 5, 2021 (CN) .......................... 202110896677.8

(51) Int. Cl.
*H04L 67/51* (2022.01)
*H04L 61/4511* (2022.01)
*H04W 8/14* (2009.01)
(52) U.S. Cl.
CPC .......... *H04L 67/51* (2022.05); *H04L 61/4511* (2022.05); *H04W 8/14* (2013.01)
(58) Field of Classification Search
CPC ... H04L 67/51; H04L 61/4511; H04L 67/131; H04L 67/14; H04L 67/565; H04W 8/00;
(Continued)

(56) References Cited

U.S. PATENT DOCUMENTS

2015/0288652 A1 10/2015 Prasad et al.
2018/0192471 A1* 7/2018 Li .......................... H04W 80/10

FOREIGN PATENT DOCUMENTS

CN 112311691 A 2/2021
CN 112437104 A 3/2021
(Continued)

OTHER PUBLICATIONS

3GPP TS 23.548 v1.0.0 (Jun. 2021), 3rd Generation Partnership Project; Technical Specification Group Services and System Aspects; 5G System Enhancements for Edge Computing; Stage 2 (Release 17), XP052029450, total 48 pages.
(Continued)

*Primary Examiner* — David R Lazaro
*Assistant Examiner* — Mariegeorges A Henry

(57) ABSTRACT

A method and an apparatus for discovering an edge application server (EAS) are provided. A session management function (SMF) network element that serves a session of a terminal apparatus obtains information about at least one EAS, or obtains indication information of an EAS that cannot serve the terminal apparatus; and the SMF network element determines first information based on the obtained information, where the first information is used to determine information about an extension mechanisms for domain name system client subnet (ECS) option, or the first information is used to determine an address of a local domain name system (DNS) server, and the information about the ECS option or the address of the local DNS server is used to determine an EAS that serves the terminal apparatus. The first information is determined when the information about the EAS or the EAS that cannot serve the terminal apparatus is considered.

12 Claims, 11 Drawing Sheets

(58) Field of Classification Search
CPC ........... H04W 4/50; H04W 8/02; H04W 8/14;
H04W 24/02
See application file for complete search history.

(56) References Cited

FOREIGN PATENT DOCUMENTS

| | | | |
|---|---|---|---|
| CN | 113132897 A | 7/2021 | |
| CN | 113795014 A | 12/2021 | |
| WO | WO-2021064717 A1 * | 4/2021 | ............. H04L 45/04 |

OTHER PUBLICATIONS

Huawei et al.: "Addressing ENs on SMF obtaining DNS information from AF", 3GPP Draft; S2-2102493, 3rd Generation Partnership Project (3GPP), Mobile Competence Centre ; 650, Route Des Lucioles; F-06921 Sophia-Antipolis Cedex ; France, vol. SA WG2, No. e-meeting; Apr. 12, 2021-Apr. 16, 2021, Apr. 6, 2021, total 6 pages.
3GPP TS 23.501 V17.1.1 (Jun. 2021),3rd Generation Partnership Project; Technical Specification Group Services and System Aspects; System architecture for the 5G System (5GS); Stage 2 (Release 17), total 518 pages.
3GPP TS 23.503 V17.1.0 (Jun. 2021), 3rd Generation Partnership Project; Technical Specification Group Services and System Aspects; Policy and charging control framework for the5G System (5GS); Stage 2(Release 17), 137 pages.
3GPP TS 23.502 V17.1.0 (Jun. 2021), 3rd Generation Partnership Project; Technical Specification Group Services and System Aspects; Procedures for the 5G System (5GS); Stage 2 (Release 17), total 686 pages.

* cited by examiner

TO FIG. 5B

CONT. FROM FIG. 5A

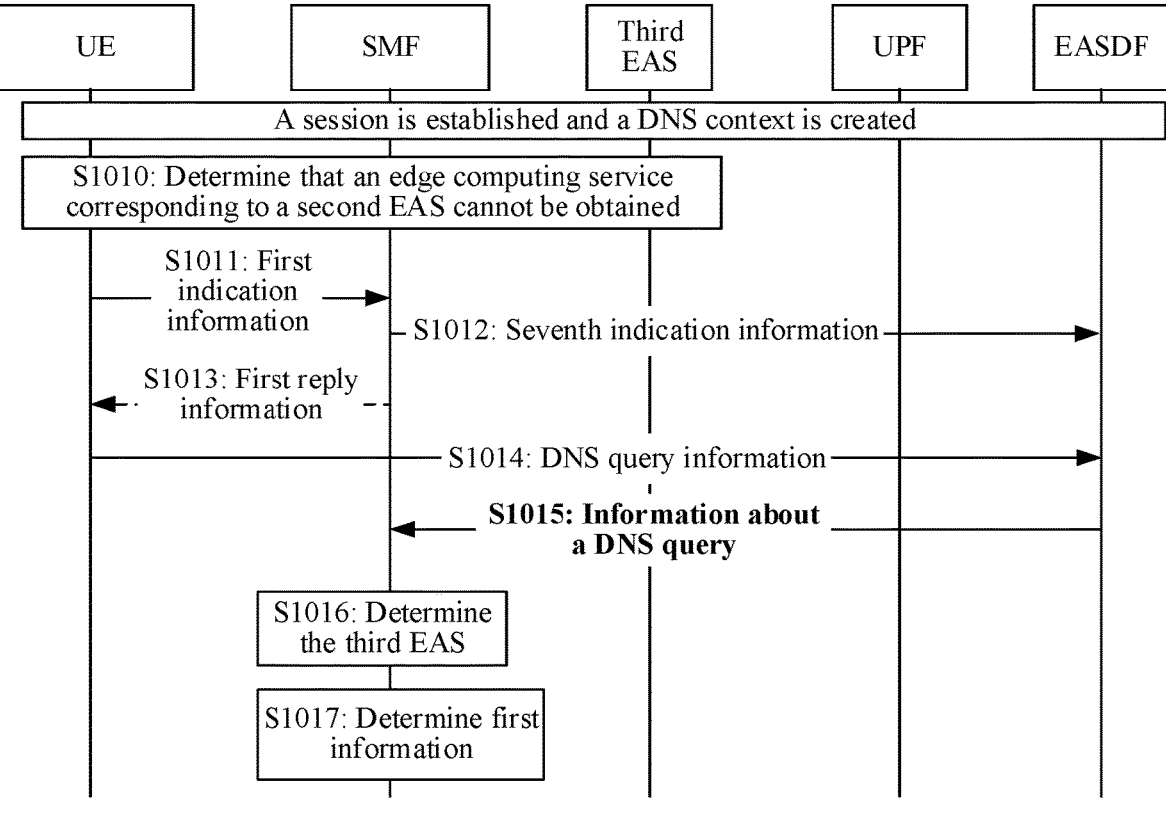

| UE | SMF | Third EAS | UPF | EASDF |
|----|-----|-----------|-----|-------|

A session is established and a DNS context is created

S1010: Determine that an edge computing service corresponding to a second EAS cannot be obtained S1011: First indication information S1012: Seventh indication information S1013: First reply information S1014: DNS query information

S1015: Information about a DNS query

S1016: Determine the third EAS

S1017: Determine first information

FIG. 10

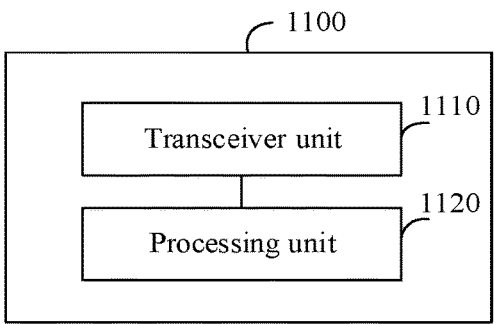

1100

Transceiver unit 1110

Processing unit 1120

FIG. 11

METHOD AND APPARATUS FOR DISCOVERING EDGE APPLICATION SERVER

CROSS-REFERENCE TO RELATED APPLICATIONS

This application is a continuation of International Application No. PCT/CN2022/106229, filed on Jul. 18, 2022, which claims priority to Chinese Patent Application No. 202110896677.8, filed on Aug. 5, 2021. The disclosures of the aforementioned applications are hereby incorporated by reference in their entireties.

TECHNICAL FIELD

This application relates to the field of communication technologies, and more specifically, to a method and an apparatus for discovering an edge application server.

BACKGROUND

In some communication systems, for example, in a 5th generation (5G) communication system, discovery of an edge application server (EAS) in edge computing may be implemented by using a domain name system (DNS) technology. Specifically, the technology includes: introducing an edge application server discovery function (EASDF) network element in edge computing. The EASDF network element includes at least one of the following functions: receiving a DNS message handling rule sent by a session management function (SMF) network element, sending a DNS message to a local DNS server (DNS server) or a central DNS server, and adding an extension mechanisms for DNS client subnet (ECS) option for DNS query information.

Based on the ECS option, the DNS server may return an EAS internet protocol (IP) address that matches the ECS option. However, when the SMF determines information that is sent to the EASDF and that is for constructing an ECS option, an EAS corresponding to the determined ECS option may be overloaded, an EAS upgrade server cannot provide a service, or the like. Consequently, quality of service of the EAS deteriorates.

SUMMARY

This application provides a method for discovering an edge application server, to improve quality of service of edge application server (EAS).

According to a first aspect, a method for discovering an edge application server is provided. The method may be performed by a session management function network element, or may be performed by a chip, a chip system, or a circuit in a network element having a session management function. This is not limited in this application. For ease of description, the following provides descriptions by using an example in which the method is performed by the session management function network element.

The method includes: The session management function network element obtains first indication information or information about at least one edge application server (EAS), where the session management function network element is a network element that serves a session of a terminal apparatus, the information about the EAS indicates at least one of a selection weight of the EAS, a load status of the EAS, or a service status of the EAS, and the first indication information indicates an EAS that cannot serve the terminal apparatus; and the session management function network element determines first information based on the obtained information about the EAS or the obtained first indication information, where the first information is used to determine information about an extension mechanisms for domain name system client subnet (ECS) option, or the first information is used to determine an address of a local domain name system (DNS) server, and the information about the ECS option or the address of the local DNS server is used to determine an EAS that serves the terminal apparatus.

Based on the foregoing technical solution, information used to construct the ECS option or information used to determine the address of the local DNS server is determined when related information of the EAS or the EAS that cannot serve the terminal apparatus is considered, to avoid a case in which an edge computing platform or an EAS corresponding to the ECS option or the address of the local DNS server is overloaded, a case in which an EAS upgrade server cannot provide a service, or another case. Therefore, deterioration of quality of service of the EAS is avoided.

In addition, when statuses or load of a plurality of EASs is considered, an EAS with better quality of service may be selected, so that the quality of service of the EAS can be improved.

With reference to the first aspect, in some implementations of the first aspect, that the session management function network element obtains information about at least one EAS includes: The session management function network element receives the information about the at least one EAS from an application function network element.

With reference to the first aspect, in some implementations of the first aspect, the information about the at least one EAS includes information about at least one edge computing platform, where the information about the at least one edge computing platform indicates the information about the at least one EAS, and the at least one EAS is deployed on the at least one edge computing platform.

Based on the foregoing technical solution, the session management function network element may receive, from the application function network element, the information about the EAS or the information that is about the edge computing platform and that is used to determine the information about the EAS. In other words, the session management function network element may indirectly determine, based on the information about the edge computing platform, the information about the EAS deployed on the edge computing platform, to improve flexibility of the solution.

With reference to the first aspect, in some implementations of the first aspect, the method further includes: The session management function network element sends subscription information or request information to the application function network element, where the subscription information or the request information is used to obtain the information about the at least one EAS.

Based on the foregoing technical solution, the application function network element may actively deliver the information about the at least one EAS, or may deliver the information about the at least one EAS based on the subscription information or the request information of the session management function network element. This provides different triggering manners for the application function network element to deliver the information, and improves flexibility of the solution.

With reference to the first aspect, in some implementations of the first aspect, the method further includes: The session management function network element sends second indication information to a user plane function network element, where the second indication information indicates the user plane function network element to detect a first data packet, and a destination internet protocol (IP) address of the first data packet is an IP address of a first EAS; and the session management function network element receives first reporting information from the user plane function network element, where the first reporting information includes a detection result of the first data packet, the detection result includes access traffic information of the first EAS and/or transmission delay information of the first data packet between the user plane function network element and the first EAS, and the first EAS is any one of the at least one EAS.

With reference to the first aspect, in some implementations of the first aspect, that the session management function network element obtains information about at least one EAS includes: The session management function network element determines information about the first EAS based on the first reporting information; or the session management function network element sends the first reporting information to a network data analysis function network element, where the first reporting information is used to determine information about the first EAS; and the session management function network element receives the information about the first EAS from the network data analysis function network element.

Based on the foregoing technical solution, the session management function network element may directly determine the information about the EAS based on the data packet detection result reported by the user plane function network element; or the session management function network element may send, to the network data analysis function network element, the data packet detection result reported by the user plane function network element, and the network data analysis function network element performs data analysis to obtain the information about the EAS, and then sends the information to the session management function network element. This provides different manners of determining the information about the EAS, and improves flexibility of the solution.

With reference to the first aspect, in some implementations of the first aspect, the method further includes: The session management function network element sends third indication information to a user plane function network element, where the third indication information indicates the user plane function network element to determine a status of a first EAS; and the session management function network element receives second reporting information from the user plane function network element, where the second reporting information includes indication information of the status of the first EAS, and the first EAS is any one of the at least one EAS.

With reference to the first aspect, in some implementations of the first aspect, that the session management function network element obtains information about at least one EAS includes: The session management function network element determines information about the first EAS based on the second reporting information; or the session management function network element sends the second reporting information to a network data analysis function network element, where the second reporting information is used to determine information about the first EAS; and the session management function network element receives the information about the first EAS from the network data analysis function network element.

Based on the foregoing technical solution, the session management function network element may directly determine the information about the EAS based on a network detection result reported by the user plane function network element; or the session management function network element may send, to the network data analysis function network element, a network detection result reported by the user plane function network element, and the network data analysis function network element performs data analysis to obtain the information about the EAS, and then sends the information to the session management function network element. This provides different manners of determining the information about the EAS, and improves flexibility of the solution.

With reference to the first aspect, in some implementations of the first aspect, the method further includes: The session management function network element sends fourth indication information to a user plane function (UPF) network element, where the fourth indication information indicates the UPF network element to buffer DNS query information for a first fully qualified domain name (FQDN) from the terminal apparatus; and the session management function network element receives third reporting information from the UPF network element, where the third reporting information includes the first FQDN. That the session management function network element obtains first indication information includes: the session management function network element determines the first indication information based on the third reporting information, where the first indication information indicates a second EAS that cannot serve the terminal apparatus.

With reference to the first aspect, in some implementations of the first aspect, that the session management function network element obtains first indication information includes: The session management function network element receives the first indication information from the terminal apparatus, where the first indication information indicates a third EAS that cannot serve the terminal apparatus.

Based on the foregoing technical solution, the session management function network element may determine, based on information related to the DNS query information reported by the user plane function network element, the EAS that cannot serve the terminal apparatus, or may determine, based on information reported by the terminal apparatus, the EAS that cannot serve the terminal apparatus. This provides different manners of determining the EAS that cannot serve the terminal apparatus, and improves flexibility of the solution.

With reference to the first aspect, in some implementations of the first aspect, the method further includes: The session management function network element sends, to an edge application server discovery function network element, the information used to determine the ECS option or the address of the local DNS server.

Based on the foregoing technical solution, the session management function network element may send, to the edge application server discovery function network element, the information for constructing the ECS option or the address of the local DNS server, to avoid a case in which an edge computing platform or an EAS corresponding to the determined ECS option is overloaded, a case in which an EAS upgrade server cannot provide a service, or another case.

According to a second aspect, a method for discovering an edge application server is provided. The method may be performed by an application function network element, or may be performed by a chip, a chip system, or a circuit in a network element having an application function. This is not limited in this application. For ease of description, the following provides descriptions by using an example in which the method is performed by the application function network element.

The method includes: The application function network element determines information about at least one EAS, where the information about the EAS indicates at least one of a selection weight of the EAS, a load status of the EAS, or a service status of the EAS; and the application function network element sends the information about the at least one EAS to a session management function network element, where the information about the EAS is used to determine first information, the first information is used to determine information about an ECS option, or the first information is used to determine an address of a local DNS server, and the information about the ECS option or the address of the local DNS server is used to determine an EAS that serves a terminal apparatus.

Based on the foregoing technical solution, the session management function network element may receive the information about the EAS from the application function network element. Information used to construct the ECS option or the address of the local DNS server is determined when related information of the EAS is considered, to avoid a case in which an edge computing platform or an EAS corresponding to the ECS option or the address of the local DNS server is overloaded, a case in which an EAS upgrade server cannot provide a service, or another case. Therefore, deterioration of quality of service of the EAS is avoided.

With reference to the second aspect, in some implementations of the second aspect, the information about the at least one EAS includes information about at least one edge computing platform, where the information about the at least one edge computing platform indicates the information about the at least one EAS, and the at least one EAS is deployed on the at least one edge computing platform.

Based on the foregoing technical solution, the session management function network element may receive, from the application function network element, the information about the EAS or the information that is about the edge computing platform and that is used to determine the information about the EAS. In other words, the session management function network element may indirectly determine, based on the information about the edge computing platform, the information about the EAS deployed on the edge computing platform, to improve flexibility of the solution.

With reference to the second aspect, in some implementations of the second aspect, the method further includes: The application function network element receives subscription information or request information from the session management function network element, where the subscription information or the request information is used to obtain the information about the at least one EAS.

Based on the foregoing technical solution, the application function network element may actively deliver the information about the at least one EAS, or may deliver the information about the at least one EAS based on the subscription information or the request information of the session management function network element. This provides different triggering manners for the application function network element to deliver the information, and improves flexibility of the solution.

According to a third aspect, a method for discovering an edge application server is provided. The method may be performed by a user plane function network element, or may be performed by a chip, a chip system, or a circuit in a network element having a user plane function. This is not limited in this application. For ease of description, the following provides descriptions by using an example in which the method is performed by the user plane function network element.

The method includes: The user plane function network element receives second indication information from a session management function network element, where the second indication information indicates the user plane function network element to detect a first data packet, and a destination internet protocol IP address of the first data packet is an IP address of a first EAS; the user plane function network element detects the first data packet to obtain a detection result of the first data packet, where the detection result includes access traffic information of the first EAS and/or transmission delay information of the first data packet between the user plane function network element and the first EAS; and the user plane function network element sends first reporting information to the session management function network element, where the first reporting information includes the detection result of the first data packet, the first reporting information is used to determine information about the first EAS, and the information about the first EAS indicates a load status of the first EAS and/or indicates a service status of the first EAS. The information about the EAS is used to determine first information, the first information is used to determine information about an ECS option, or the first information is used to determine an address of a local DNS server, and the information about the ECS option or the address of the local DNS server is used to determine an EAS that serves a terminal apparatus.

Based on the foregoing technical solution, the session management function network element may determine the information about the EAS based on the data packet detection result reported by the user plane function network element. Information used to construct the ECS option or information used to determine the address of the local DNS server is determined when the load status of the EAS or the service status of the EAS is considered, to avoid a case in which an edge computing platform or an EAS corresponding to the ECS option or the address of the local DNS server is overloaded, a case in which an EAS upgrade server cannot provide a service, or another case. Therefore, deterioration of quality of service of the EAS is avoided.

According to a fourth aspect, a method for discovering an edge application server is provided. The method may be performed by a user plane function network element, or may be performed by a chip, a chip system, or a circuit in a network element having a user plane function. This is not limited in this application. For ease of description, the following provides descriptions by using an example in which the method is performed by the user plane function network element.

The method includes: The user plane function network element receives third indication information from a session management function network element, where the third indication information indicates the user plane function network element to determine a status of a first EAS; the user plane function network element sends a detection data packet to the first EAS; the user plane function network element determines the status of the first EAS based on a response of the first EAS to the detection data packet; and the user plane function network element sends second reporting information to the session management function network element, where the second reporting information includes indication information of the status of the first EAS, the second reporting information is used to determine information about the first EAS, and the information about the first EAS indicates a load status of the first EAS and/or indicates a service status of the first EAS. The information about the EAS is used to determine first information, the first information is used to determine information about an ECS option, or the first information is used to determine an address of a local DNS server, and the information about the ECS option or the address of the local DNS server is used to determine an EAS that serves a terminal apparatus.

Based on the foregoing technical solution, the session management function network element may determine the information about the EAS based on a network detection result reported by the user plane function network element. Information used to construct the ECS option or information used to determine the address of the local DNS server is determined when the load status of the EAS or the service status of the EAS is considered, to avoid a case in which an edge computing platform or an EAS corresponding to the ECS option or the address of the local DNS server is overloaded, a case in which an EAS upgrade server cannot provide a service, or another case. Therefore, deterioration of quality of service of the EAS is avoided.

According to a fifth aspect, a method for discovering an edge application server is provided. The method may be performed by a user plane function network element, or may be performed by a chip, a chip system, or a circuit in a network element having a user plane function. This is not limited in this application. For ease of description, the following provides descriptions by using an example in which the method is performed by the user plane function network element.

The method includes: The user plane function network element receives fourth indication information from a session management function network element, where the fourth indication information indicates the user plane function network element to buffer DNS query information for a first FQDN from a terminal apparatus; the user plane function network element buffers the DNS query information; and the user plane function network element sends third reporting information to the session management function network element, where the third reporting information includes the first FQDN, the third reporting information is used to determine first indication information, and the first indication information indicates a second EAS that cannot serve the terminal apparatus. The first indication information is used to determine first information, the first information is used to determine information about an ECS option, or the first information is used to determine an address of a local DNS server, and the information about the ECS option or the address of the local DNS server is used to determine an EAS that serves the terminal apparatus.

Based on the foregoing technical solution, the session management function network element may determine, based on information reported by the user plane function network element, information about the EAS that cannot serve the terminal apparatus. Information used to construct the ECS option or information used to determine the address of the local DNS server is determined when the EAS that cannot serve the terminal apparatus is considered, to avoid a case in which an edge computing platform or an EAS corresponding to the ECS option or the address of the local DNS server cannot provide a service. Therefore, deterioration of quality of service of the EAS is avoided.

According to a sixth aspect, a method for discovering an edge application server is provided. The method may be performed by a terminal apparatus, or may be performed by a chip, a chip system, or a circuit in the terminal apparatus. This is not limited in this application. For ease of description, the following provides descriptions by using an example in which the method is performed by the terminal apparatus.

The method includes: The terminal apparatus determines first indication information, where the first indication information indicates a third EAS that cannot serve the terminal apparatus; and the terminal apparatus sends the first indication information to a session management function network element, where the first indication information is used to determine first information, the first information is used to determine information about an ECS option, or the first information is used to determine an address of a local DNS server, and the information about the ECS option or the address of the local DNS server is used to determine an EAS that serves the terminal apparatus.

Based on the foregoing technical solution, the session management function network element may determine, based on information reported by the terminal apparatus, information about the EAS that cannot serve the terminal apparatus. Information used to construct the ECS option or information used to determine the address of the local DNS server is determined when the EAS that cannot serve the terminal apparatus is considered, to avoid a case in which an edge computing platform or an EAS corresponding to the ECS option or the address of the local DNS server cannot provide a service. Therefore, deterioration of quality of service of the EAS is avoided.

According to a seventh aspect, an apparatus for discovering an edge application server is provided, and includes a unit configured to perform the method in any possible implementation of the first aspect. The apparatus includes:

an obtaining unit, configured to obtain first indication information or information about at least one EAS, where the apparatus is a network element that serves a session of a terminal apparatus, the information about the EAS indicates at least one of a selection weight of the EAS, a load status of the EAS, or a service status of the EAS, and the first indication information indicates an EAS that cannot serve the terminal apparatus; and a processing unit, configured to determine first information based on the obtained information about the EAS or the obtained first indication information, where the first information is used to determine information about an ECS option, or the first information is used to determine an address of a local DNS server, and the information about the ECS option or the address of the local DNS server is used to determine an EAS that serves the terminal apparatus.

With reference to the seventh aspect, in some implementations of the seventh aspect, the obtaining unit is a receiving unit. That the obtaining unit obtains the information about the at least one EAS includes: The receiving unit receives the information about the at least one EAS from an application function network element.

With reference to the seventh aspect, in some implementations of the seventh aspect, the information about the at least one EAS includes information about at least one edge computing platform, where the information about the at least one edge computing platform indicates the information about the at least one EAS, and the at least one EAS is deployed on the at least one edge computing platform.

With reference to the seventh aspect, in some implementations of the seventh aspect, the apparatus further includes: a sending unit, configured to send subscription information or request information to the application function network element, where the subscription information or the request information is used to obtain the information about the at least one EAS.

With reference to the seventh aspect, in some implementations of the seventh aspect, the apparatus further includes: a sending unit, configured to send second indication information to a user plane function network element, where the second indication information indicates the user plane function network element to detect a first data packet, and a destination IP address of the first data packet is an IP address of a first EAS; and a receiving unit, configured to receive first reporting information from the user plane function network element, where the first reporting information includes a detection result of the first data packet, the detection result includes access traffic information of the first EAS and/or transmission delay information of the first data packet between the user plane function network element and the first EAS, and the first EAS is any one of the at least one EAS.

With reference to the seventh aspect, in some implementations of the seventh aspect, that the obtaining unit obtains the information about the at least one EAS includes: The processing unit determines information about the first EAS based on the first reporting information; or the sending unit sends the first reporting information to a network data analysis function network element, where the first reporting information is used to determine information about the first EAS; and the receiving unit receives the information about the first EAS from the network data analysis function network element.

With reference to the seventh aspect, in some implementations of the seventh aspect, the apparatus further includes: a sending unit, configured to send third indication information to a user plane function network element, where the third indication information indicates the user plane function network element to determine a status of a first EAS; and a receiving unit, configured to receive second reporting information from the user plane function network element, where the second reporting information includes indication information of the status of the first EAS, and the first EAS is any one of the at least one EAS.

With reference to the seventh aspect, in some implementations of the seventh aspect, that the obtaining unit obtains the information about the at least one EAS includes: The processing unit determines information about the first EAS based on the second reporting information; or the sending unit sends the second reporting information to a network data analysis function network element, where the second reporting information is used to determine information about the first EAS; and the receiving unit receives the information about the first EAS from the network data analysis function network element.

With reference to the seventh aspect, in some implementations of the seventh aspect, the apparatus further includes: a sending unit, configured to send fourth indication information to a UPF network element, where the fourth indication information indicates the UPF network element to buffer DNS query information for a first FQDN from the terminal apparatus; and a receiving unit, configured to receive third reporting information from the user plane function network element, where the third reporting information includes the first FQDN. The obtaining unit is a processing unit. That the obtaining unit obtains the first indication information includes: The processing unit determines the first indication information based on the third reporting information, where the first indication information indicates a second EAS that cannot serve the terminal apparatus.

With reference to the seventh aspect, in some implementations of the seventh aspect, the obtaining unit is a receiving unit. That the obtaining unit obtains the first indication information includes: The receiving unit receives the first indication information from the terminal apparatus, where the first indication information indicates a third EAS that cannot serve the terminal apparatus.

With reference to the seventh aspect, in some implementations of the seventh aspect, the apparatus further includes: a sending unit, configured to send, to an edge application server discovery function network element, the information used to determine the ECS option or the address of the local DNS server.

According to an eighth aspect, an apparatus for discovering an edge application server is provided, and includes a unit configured to perform the method in any possible implementation of the second aspect. The apparatus includes:

a processing unit, configured to determine information about at least one EAS or information about at least one edge computing platform, where the information about the at least one edge computing platform indicates the information about the at least one EAS, the at least one EAS is deployed on the at least one edge computing platform, and the information about the EAS indicates at least one of a selection weight of the EAS, a load status of the EAS, or a service status of the EAS; and a sending unit, configured to send the information about the at least one EAS to a session management function network element, where the information about the EAS is used to determine first information, the first information is used to determine information about an ECS option, or the first information is used to determine an address of a local DNS server, and the information about the ECS option or the address of the local DNS server is used to determine an EAS that serves a terminal apparatus.

With reference to the eighth aspect, in some implementations of the eighth aspect, the apparatus further includes: a receiving unit, configured to receive subscription information or request information from the session management function network element, where the subscription information or the request information is used to obtain the information about the at least one EAS.

According to a ninth aspect, an apparatus for discovering an edge application server is provided, and includes a unit configured to perform the method in any possible implementation of the third aspect. The apparatus includes:

a receiving unit, configured to receive second indication information from a session management function network element, where the second indication information indicates the apparatus to detect a first data packet, and a destination IP address of the first data packet is an IP address of a first EAS;

a processing unit, configured to detect the first data packet to obtain a detection result of the first data packet, where the detection result includes access traffic information of the first EAS and/or transmission delay information of the first data packet between the apparatus and the first EAS; and a sending unit, configured to send first reporting information to the session management function network element, where the first reporting information includes the detection result of the first data packet, the first reporting information is used to determine information about the first EAS, and the information about the first EAS indicates a load status of the first EAS and/or indicates a service status of the first EAS. The information about the EAS is used to determine first information, the first information is used to determine information about an ECS option, or the first information is used to determine an address of a local DNS server, and the information about the ECS option or the address of the local DNS server is used to determine an EAS that serves a terminal apparatus.

According to a tenth aspect, an apparatus for discovering an edge application server is provided, and includes a unit configured to perform the method in any possible implementation of the fourth aspect. The apparatus includes:

a receiving unit, configured to receive third indication information from a session management function network element, where the third indication information indicates the apparatus to determine a status of a first EAS;

a sending unit, configured to send a detection data packet to the first EAS; and a processing unit, configured to determine the status of the first EAS based on a response of the first EAS to the detection data packet.

The sending unit is configured to send second reporting information to the session management function network element, where the second reporting information includes indication information of the status of the first EAS, the second reporting information is used to determine information about the first EAS, and the information about the first EAS indicates a load status of the first EAS and/or indicates a service status of the first EAS. The information about the EAS is used to determine first information, the first information is used to determine information about an extension mechanisms for domain name system client subnet ECS option, or the first information is used to determine an address of a local DNS server, and the information about the ECS option or the address of the local DNS server is used to determine an EAS that serves a terminal apparatus.

According to an eleventh aspect, an apparatus for discovering an edge application server is provided, and includes a unit configured to perform the method in any possible implementation of the fifth aspect. The apparatus includes:

a receiving unit, configured to receive fourth indication information from a session management function network element, where the fourth indication information indicates the apparatus to buffer DNS query information for a first FQDN from a terminal apparatus;

a processing unit, configured to buffer the DNS query information; and a sending unit, configured to send third reporting information to the session management function network element, where the third reporting information includes the first FQDN, the third reporting information is used to determine first indication information, and the first indication information indicates a second EAS that cannot serve the terminal apparatus. The first indication information is used to determine first information, the first information is used to determine information about an ECS option, or the first information is used to determine an address of a local domain name system DNS server, and the information about the ECS option or the address of the local DNS server is used to determine an EAS that serves the terminal apparatus.

According to a twelfth aspect, an apparatus for discovering an edge application server is provided, and includes a unit configured to perform the method in any possible implementation of the sixth aspect. The apparatus includes:

a processing unit, configured to determine first indication information, where the first indication information indicates a third EAS that cannot serve a terminal apparatus; and a sending unit, configured to send the first indication information to a session management function network element, where the first indication information is used to determine first information, the first information is used to determine information about an ECS option, or the first information is used to determine an address of a local DNS server, and the information about the ECS option or the address of the local DNS server is used to determine an EAS that serves the terminal apparatus.

According to a thirteenth aspect, an apparatus for discovering an edge application server is provided. The apparatus for discovering an edge application server includes a processor, configured to implement a function of the session management function network element in the method described in the first aspect.

Optionally, the apparatus for discovering an edge application server may further include a memory, the memory is coupled to the processor, and the processor is configured to implement the function of the session management function network element in the method described in the first aspect.

In a possible implementation, the memory is configured to store program instructions and data. The memory is coupled to the processor. The processor may invoke and execute the program instructions stored in the memory, to implement the function of the session management function network element in the method described in the first aspect.

Optionally, the apparatus for discovering an edge application server may further include a communication interface, and the communication interface is used by the apparatus for discovering an edge application server to communicate with another device. The communication interface may be a transceiver, an input/output interface, a circuit, or the like.

In a possible design, the apparatus for discovering an edge application server includes a processor and a communication interface.

The processor is configured to run a computer program, so that the apparatus for discovering an edge application server implements any method described in the first aspect.

The processor communicates with an external device through the communication interface.

It may be understood that the external device may be an object other than the processor, or an object other than the apparatus.

In another possible design, the apparatus for discovering an edge application server is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a fourteenth aspect, an apparatus for discovering an edge application server is provided. The apparatus for discovering an edge application server includes a processor, configured to implement a function of the application function network element in the method described in the second aspect.

Optionally, the apparatus for discovering an edge application server may further include a memory, the memory is coupled to the processor, and the processor is configured to implement the function of the application function network element in the method described in the second aspect.

In a possible implementation, the memory is configured to store program instructions and data. The memory is coupled to the processor. The processor may invoke and execute the program instructions stored in the memory, to implement the function of the application function network element in the method described in the second aspect.

Optionally, the apparatus for discovering an edge application server may further include a communication interface, and the communication interface is used by the apparatus for discovering an edge application server to communicate with another device. The communication interface may be a transceiver, an input/output interface, a circuit, or the like.

In a possible design, the apparatus for discovering an edge application server includes a processor and a communication interface.

The processor communicates with an external device through the communication interface.

The processor is configured to run a computer program, so that the apparatus for discovering an edge application server implements any method described in the second aspect.

It may be understood that the external device may be an object other than the processor, or an object other than the apparatus.

In another possible design, the apparatus for discovering an edge application server is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a fifteenth aspect, an apparatus for discovering an edge application server is provided. The apparatus for discovering an edge application server includes a processor, configured to implement a function of the user plane function network element in the method described in the third aspect to the fifth aspect.

Optionally, the apparatus for discovering an edge application server may further include a memory, the memory is coupled to the processor, and the processor is configured to implement the function of the user plane function network element in the method described in the third aspect to the fifth aspect.

In a possible implementation, the memory is configured to store program instructions and data. The memory is coupled to the processor. The processor may invoke and execute the program instructions stored in the memory, to implement the function of the user plane function network element in the method described in the third aspect to the fifth aspect.

Optionally, the apparatus for discovering an edge application server may further include a communication interface, and the communication interface is used by the apparatus for discovering an edge application server to communicate with another device. The communication interface may be a transceiver, an input/output interface, a circuit, or the like.

In a possible design, the apparatus for discovering an edge application server includes a processor and a communication interface.

The processor communicates with an external device through the communication interface.

The processor is configured to run a computer program, so that the apparatus for discovering an edge application server implements any method described in the third aspect to the fifth aspect.

It may be understood that the external device may be an object other than the processor, or an object other than the apparatus.

In another possible design, the apparatus for discovering an edge application server is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a sixteenth aspect, an apparatus for information transmission is provided. The apparatus for information transmission includes a processor, configured to implement a function of the terminal apparatus in the method described in the sixth aspect.

Optionally, the apparatus for information transmission may further include a memory, the memory is coupled to the processor, and the processor is configured to implement the function of the terminal apparatus in the method described in the sixth aspect.

In a possible implementation, the memory is configured to store program instructions and data. The memory is coupled to the processor. The processor may invoke and execute the program instructions stored in the memory, to implement the function of the terminal apparatus in the method described in the sixth aspect.

Optionally, the apparatus for information transmission may further include a communication interface, and the communication interface is used by the apparatus for information transmission to communicate with another device. The communication interface may be a transceiver, an input/output interface, a circuit, or the like.

In a possible design, the apparatus for information transmission includes a processor and a communication interface.

The processor communicates with an external device through the communication interface.

The processor is configured to run a computer program, so that the apparatus for information transmission implements any method described in the sixth aspect.

It may be understood that the external device may be an object other than the processor, or an object other than the apparatus.

In another possible design, the apparatus for information transmission is a chip or a chip system. The communication interface may be an input/output interface, an interface circuit, an output circuit, an input circuit, a pin, a related circuit, or the like on the chip or the chip system. The processor may alternatively be embodied as a processing circuit or a logic circuit.

According to a seventeenth aspect, this application provides a computer-readable storage medium. The computer-readable storage medium stores instructions, and when the instructions are run on a computer, the computer is enabled to perform the method in the foregoing aspects.

According to an eighteenth aspect, this application provides a computer program product including instructions. When the computer program product runs on a computer, the computer is enabled to perform the method in the foregoing aspects.

According to a nineteenth aspect, a communication system is provided, and includes the apparatus for discovering an edge application server shown in the seventh aspect and the apparatus for discovering an edge application server shown in any one or more of the eighth aspect to the twelfth aspect.

According to a twentieth aspect, a chip apparatus is provided, and includes a processing circuit. The processing circuit is configured to: invoke a program from a memory and run the program, to enable a communication device in which the chip apparatus is installed to perform the method in any one of the possible implementations of the first aspect to the sixth aspect.

BRIEF DESCRIPTION OF DRAWINGS (a) in FIG. 1 and (b) in FIG. 1 are communication systems to which embodiments of this application are applicable;

FIG. 10 is a schematic flowchart of still another method for discovering an edge application server;

FIG. 11 is a schematic block diagram of an apparatus according to an embodiment of this application;

DESCRIPTION OF EMBODIMENTS

The following describes technical solutions of this application with reference to the accompanying drawings.

The technical solutions in embodiments of this application may be applied to various communication systems, for example, a 5th generation (5G) system, a new radio (NR) system, or a long term evolution (LTE) system. The technical solutions provided in this application may be further applied to a future communication system, for example, a 6th generation mobile communication system. The technical solutions in embodiments of this application may be further applied to device-to-device (D2D) communication, vehicle-to-everything (V2X) communication, machine-to-machine (M2M) communication, or machine type communication (MTC), and applied to an internet of things (IoT) communication system, or another communication system.

For ease of understanding embodiments of this application, the communication system to which embodiments of this application are applicable is first briefly described with reference to FIG. 1.

Figure 1:
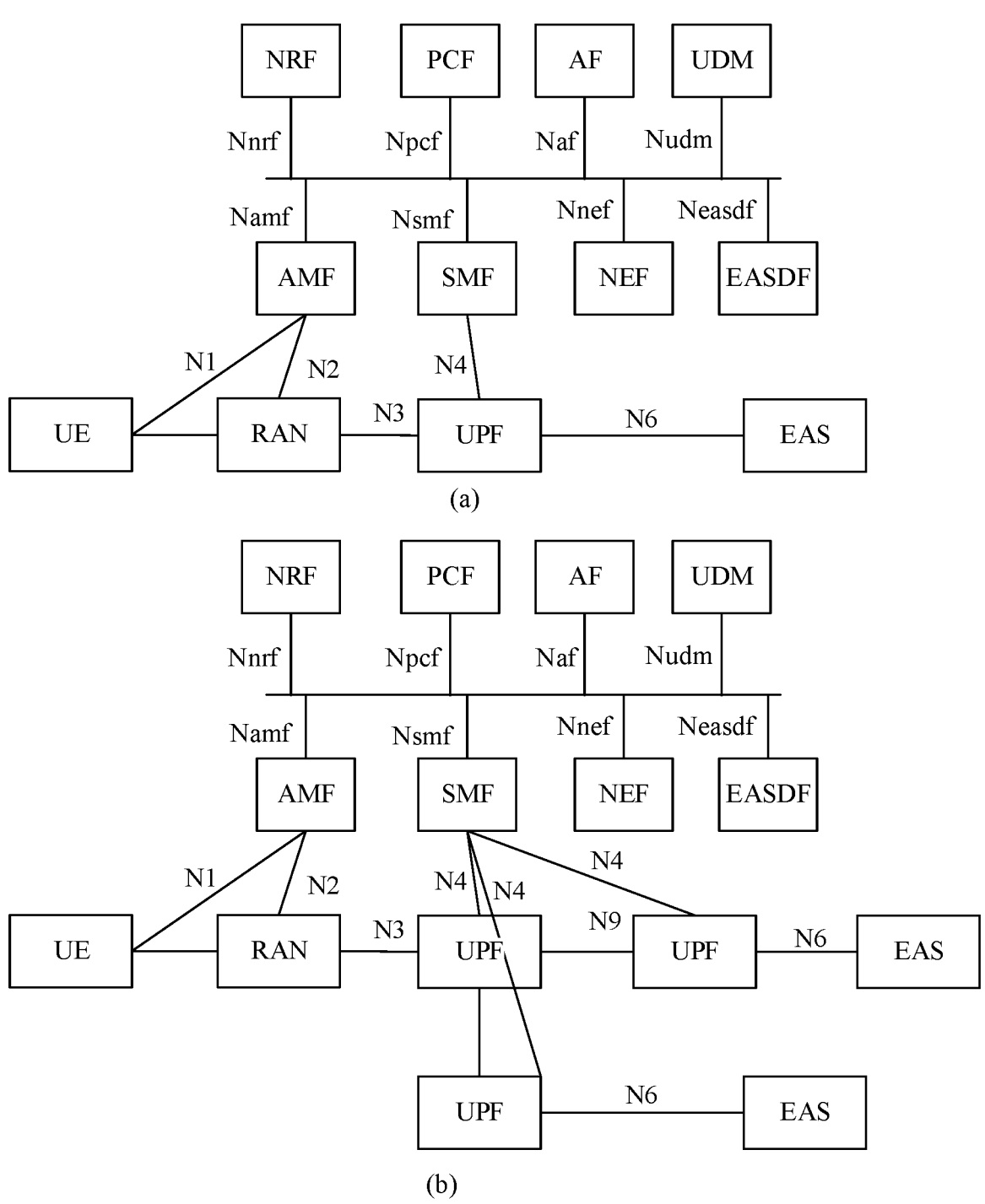

In example descriptions, (a) in FIG. 1 is a schematic architectural diagram of a 5G system 100a to which an embodiment of this application is applicable. As shown in (a) in FIG. 1, a network architecture may include but is not limited to the following network elements (or referred to as functional network elements, functional entities, nodes, devices, or the like):

user equipment (UE), a (radio) access network ((radio) access network, (R)AN) device, a user plane function (UPF) network element, an edge application server (EAS), an access and mobility management function (AMF) network element, a session management function (SMF) network element, a network exposure function (NEF) network element, an EASDF network element, a network function repository function (NF repository function, NRF) network element, a policy control function (PCF) network element, an application function (AF) network element, a unified data management (UDM) network element, and the like.

The following briefly describes the network elements shown in (a) in FIG. 1.

1. The user equipment may be referred to as a terminal device (terminal device), a terminal apparatus, an access terminal, a subscriber unit, a subscriber station, a mobile station (MS), a mobile terminal (MT), a remote station, a remote terminal, a mobile device, a user terminal, a terminal, a wireless communication device, a user agent, or a user apparatus. The terminal device may be a device that provides voice/data connectivity for a user, for example, a handheld device or a vehicle-mounted device with a wireless connection function. Currently, some examples of the terminal may be a mobile phone (mobile phone), a tablet computer (tablet computer), a computer (for example, a laptop or a palmtop computer) with a wireless transceiver function, a mobile internet device (MID), a virtual reality (VR) device, an augmented reality (AR) device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, or a terminal device in a future evolved public land mobile network (PLMN).

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. An IoT technology can achieve massive connections, intensive coverage, and power saving for terminals by using, for example, a narrow band (NB) technology.

In addition, the terminal device may further include an intelligent printer, a train detector, and the like, and main functions include: collecting data (which is a function of some terminal devices), receiving control information and downlink data of a network device, sending an electromagnetic wave, and transmitting uplink data to the network device.

It should be understood that the user equipment may be any device that can access a network. The terminal device may communicate with the access network device by using an air interface technology.

Optionally, the user equipment may be configured to serve as a base station. For example, the user equipment may serve as a scheduling entity that provides a sidelink signal between user equipment in V2X, D2D, or the like. For example, the cellular phone communicates with a car by using a sidelink signal. The cellular phone communicates with a smart home device without relaying a communication signal through a base station.

2. The (radio) access network device is configured to provide a network access function for authorized user equipment in a specific area, and can use transmission tunnels of different quality of service based on levels, service requirements, and the like of the user equipment.

The (R)AN can manage radio resources and provide an access service for the user equipment, to forward a control signal and user equipment data between the user equipment and a core network. The (R)AN may also be understood as a base station in a conventional network.

For example, the access network device in embodiments of this application may be any communication device that has a wireless transceiver function and that is configured to communicate with the user equipment. The access network device includes but is not limited to an evolved NodeB (eNB), a gNB or a transmission point (TRP or TP) in a 5G system, for example, an NR system, or one antenna panel or a group (including a plurality of antenna panels) of antenna panels of a base station in the 5G system, or may be a network node constituting the gNB or the transmission point, for example, a baseband unit (BBU) or a distributed unit (DU).

In some deployments, the gNB may include a central unit (CU) and the DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from the information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be classified into an access network device in an access network (RAN), or the CU may be classified into an access network device in the core network (CN). This is not limited in this application.

3. User plane function (UPF) network element: The user plane function network element mainly includes the following functions: functions related to a user plane, for example, data packet routing and transmission, packet detection, service usage reporting, quality of service (QoS) handling, lawful interception, uplink packet detection, and downlink data packet storage.

For example, the UPF (short for UPF network element) may be classified into a protocol data unit session anchor UPF (protocol data unit session anchor UPF, PSA UPF) and an uplink classifier functionality UPF (uplink classifier functionality UPF, UL CL UPF).

The UPF shown in (a) in FIG. 1 is a PSA UPF, and the PSA UPF is a UPF that supports a PDU session anchor function. The UE is connected to the AMF through an N1 interface. The AN is connected to the AMF through an N2 interface, and is connected to the PSA UPF through an N3 interface. The PSA UPF is connected to the SMF through an N4 interface. The PSA UPF is connected to the EAS through an N6 interface.

In the following, for brevity of description, the PSA UPF may be referred to as a PSA for short, and the UL CL UPF may be referred to as a UL CL for short.

The user plane function network element in the 5G architecture may still be a UPF network element, or may have another name in a future communication system. This is not limited in this application.

4. The edge application server is an application deployed in an edge data network.

The edge application may also be referred to as an "application instance", and specifically, an instance (instance) that is deployed and run in the edge data network (EDN) and that is of a server application program (for example, social media software, augmented reality (AR), or virtual reality (virtual reality, VR)). One or more EASs may be deployed in one or more EDNs for one application (or referred to as a service). EASs deployed and run in different EDNs may be considered as different EASs of one application, and may share a domain name or use a domain name different from that of an application deployed on the cloud. The domain name may be a fully qualified domain name (FQDN), and may be represented by using an anycast internet protocol (IP) address or different IP addresses.

It may be understood that, the EAS may also be referred to as an edge application (server), an application instance, an edge application instance, a multi-access edge computing (MEC) application (server), an EAS function, or the like.

The EDN may be a local data center (local part of DN). The EDN includes an edge enabler server (EES) and a plurality of EASs. Each EDN has a specific service range.

5. Access and mobility management function network element: The mobility management network element mainly includes the following functions: functions related to access and mobility, for example, connection management, mobility management, registration management, access authentication and authorization, reachability management, and security context management.

The access and mobility management function network element in the 5G architecture may still be an AMF network element, or may have another name in the future communication system. This is not limited in this application.

6. The session management function network element is mainly used for session management, IP address allocation and management of the terminal device, selection of a manageable user plane function, termination of a policy control and charging function interface, downlink data notification, and the like.

The session management function network element may still be an SMF network element, or may have another name in the future communication system. This is not limited in this application.

7. The network exposure function network element may be understood as a name of a capability exposure network element in the 5G architecture. The capability exposure network element mainly includes the following functions: securely exposing a service and a capability that are provided by a 3GPP network function, for example, internally exposing or exposing to a third party; and converting or translating information exchanged with the AF and information exchanged with an internal network function, for example, an AF service identifier and internal 5G core network information such as a data network name (DNN) and single network slice selection assistance information (S-NSSAI).

8. The EAS discovery function network element is mainly responsible for discovering an EAS, and includes functions such as registering with the NRF for discovery and selection, processing a DNS message based on an indication of the SMF (for example, receiving a DNS message handling rule sent by the SMF, sending the DNS message to a local DNS server or a central DNS server, adding an ECS option to a DNS query message, exchanging a DNS message sent by the UE, and notifying the SMF of EASDF-related information), and terminating DNS security.

9. The network repository function network element may be understood as a name of the network repository function network element in the 5G architecture. The network repository function network element mainly includes the following functions: a service discovery function, and maintaining a network function (NF) profile of available network function instances and services supported by the available network function instances.

10. The policy control function network element is used for a unified policy framework to guide network behaviour, and provide policy rule information and the like for a control plane function network element (for example, the AMF network element or the SMF network element).

The policy control function network element may still be a PCF network element, or may have another name in the future communication system. This is not limited in this application.

11. The application function network element is configured to perform application-influenced data routing to provide application layer information, and may interact with a policy framework by accessing the network exposure function network element, or directly interact with the policy framework to perform policy decision request control.

The application function network element may still be an AF network element, or may have another name in the future communication system. This is not limited in this application.

12. The unified data management network element may be understood as a name of the unified data management network element in the 5G architecture. The unified data management network element mainly includes the following functions: unified data management, supporting authentication credential processing in a 3GPP authentication and key agreement mechanism, user identity handling, access authorization, registration and mobility management, subscription management, SMS message management, and the like.

The unified data management network element may still be a UDM network element, or may have another name in the future communication system. This is not limited in this application.

In example descriptions, (b) in FIG. 1 is a schematic architectural diagram of another 5G system 100*b* to which an embodiment of this application is applicable. A difference between the system 100*b* shown in (b) in FIG. 1 and the system 100*a* shown in (a) in FIG. 1 lies in that the 5G system in the system 100*a* shown in (a) in FIG. 1 does not provide access to the EAS via a UL CL/BP, and the 5G system in the system 100*b* shown in (b) in FIG. 1 provides access to the EAS via the UL CL/BP. As shown in (b) in FIG. 1, a network architecture may include but is not limited to the following network elements (or referred to as functional network elements, functional entities, nodes, devices, or the like):

UE, a (R)AN, a UPF, an EAS, a central DN, an AMF network element, an SMF network element, an NEF network element, an EASDF network element, an NRF network element, a PCF network element, an AF network element, a UDM network element, and the like.

The network elements included in (b) in FIG. 1 and connections between the network elements are similar to those in (a) in FIG. 1, and descriptions similar to those in (a) in FIG. 1 are not provided again. Differences lie in the following.

1. The UPF shown in (b) in FIG. 1 includes a UL CL UPF (or referred to as a branching point UPF (BP UPF)), a local PSA UPF (L-PSA UPF), and a central PSA UPF (C-PSA UPF).

The UL CL UPF is a UPF having an uplink classifier function. The UE is connected to the AMF through an N1 interface. The AN is connected to the AMF through an N2 interface and is connected to the UL CL UPF through an N3 interface. The UL CL UPF is connected to the SMF through an N4 interface and is connected to the PSA UPF through an N9 interface. The SMF is connected to each of the PSA UPFs through the N4 interface. The C-PSA UPF is connected to the central DN through an N6 interface. The L-PSA UPF is connected to the EAS through the N6 interface.

2. The architecture shown in (b) in FIG. 1 not only includes the EAS, but also includes the central DN.

It may be understood that, the network elements or the functional network elements may be network elements in a hardware device, software functions running on dedicated hardware, or virtualized functions instantiated on a platform (for example, a cloud platform).

In the network architecture shown in FIG. 1, the network elements may communicate with each other through the interfaces shown in the figure, and some interfaces may be implemented in a manner of non-service-oriented interfaces. As shown in the FIG. 1, the UE may interact with the AMF through the N1 interface, where an interaction message may be referred to as, for example, an N1 message (N1 Message). The RAN may interact with the AMF through the N2 interface, where the N2 interface may be used to send a non-access stratum (non-access stratum, NAS) message and the like. The RAN may interact with the UPF through the N3 interface, where the N3 interface may be used for transmission of user plane data and the like. The SMF may interact with the UPF through the N4 interface, where the N4 interface may be used for transmission of information such as tunnel identifier information of an N3 connection, data buffering indication information, and a downlink data notification message. The UPF may interact with the DN through the N6 interface, where the N6 interface may be used for transmission of user plane data and the like.

In addition, network elements of a control plane function in FIG. 1 may alternatively communicate with each other through a service-oriented interface. For example, the AMF accesses a service-oriented architecture through a Namf interface, and provides a corresponding service. The SMF accesses the service-oriented architecture through an Nsmf interface, and provides a corresponding service. Similarly, the NRF, the PCF, and the AF access the service-oriented architecture through respective corresponding interfaces, and provide corresponding services. Details are not described herein. Relationships between other interfaces and network elements are shown in FIG. 1. For brevity, details are not described herein one by one.

It should be understood that, the network architecture to which embodiments of this application can be applied is merely an example for description, and the network architecture to which embodiments of this application are applicable is not limited thereto. Any network architecture that can implement functions of the foregoing network elements is applicable to embodiments of this application.

It should be further understood that, the AMF, the SMF, the UPF, the PCF, and the like shown in FIG. 1 may be understood as network elements configured to implement different functions, for example, may be combined into a network slice as required. The network elements may be independent devices, may be integrated into a same device to implement different functions, may be network elements in the hardware device, may be the software functions running on the dedicated hardware, or may be the virtualization functions instantiated on the platform (for example, the cloud platform). Specific forms of the foregoing network elements are not limited in this application.

It should be further understood that, the foregoing names are defined merely for distinguishing between different functions, and should not constitute any limitation on this application. This application does not exclude a possibility of using other names in the 5G network and another future network. For example, in a 6G network, some or all of the foregoing network elements may still use terms in 5G, or may use other names.

It should be further understood that, names of the interfaces between the network elements in FIG. 1 are merely examples, and the interfaces may have other names during specific implementation. This is not specifically limited in this application. In addition, names of messages (or signaling) communicated between the foregoing network elements are merely examples, and do not constitute any limitation on functions of the messages.

Figure 2:
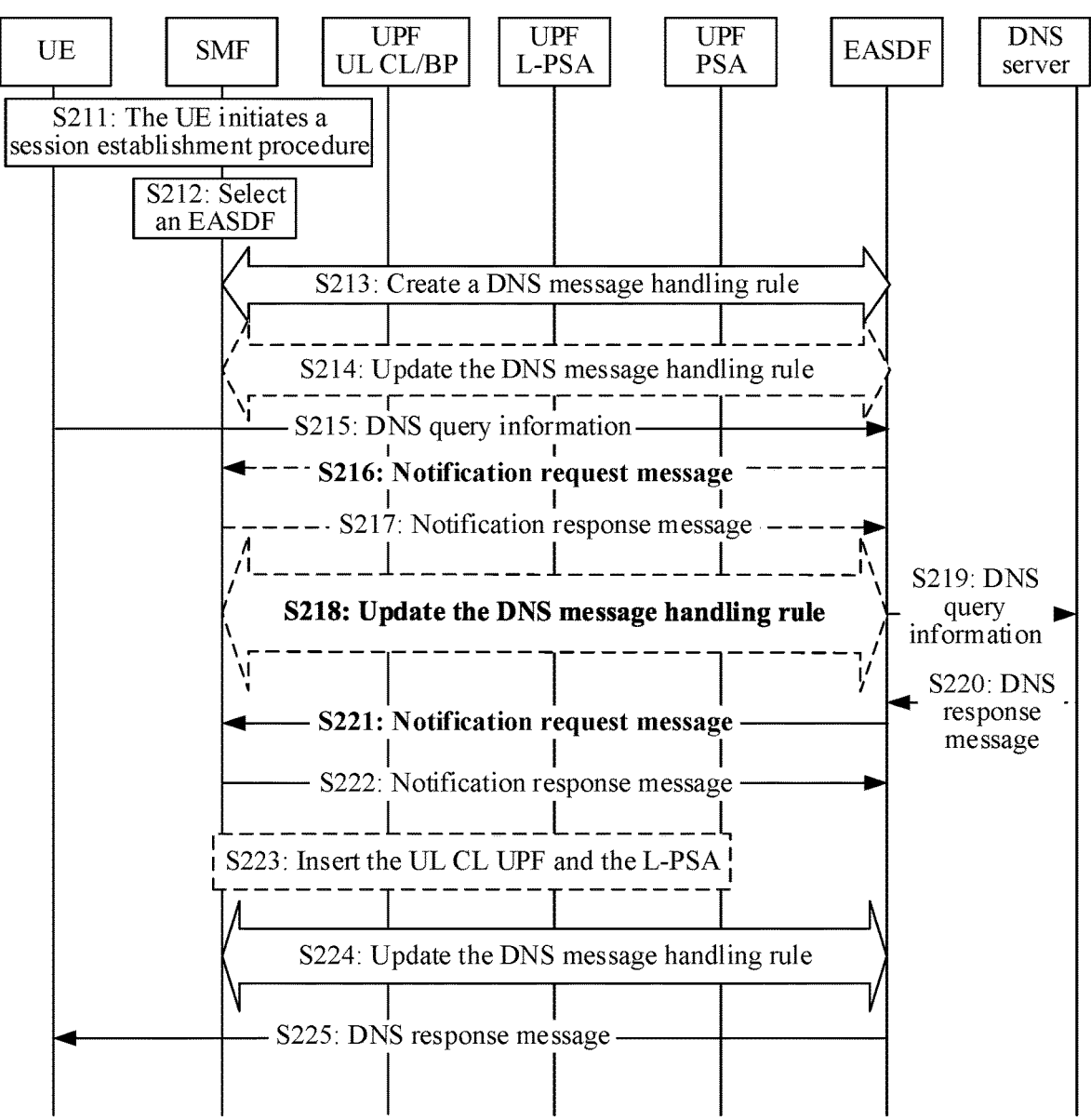
FIG. 2 is a schematic flowchart of a method for discovering an EAS.

The following describes, in detail with reference to FIG. 2, a method for discovering an EAS.

FIG. 2 is a schematic flowchart of a method for discovering an EAS. The method includes the following step.

S211: UE initiates a session establishment procedure.

Specifically, the UE starts an application (application, APP) to initiate the session establishment procedure or reuses an existing session of the UE, to establish a user plane connection between the UE and a UPF.

In the session establishment procedure, an SMF selects an EASDF. A method procedure shown in FIG. 2 further includes the following step.

S212: The SMF selects the EASDF.

It should be noted that the SMF may send an identifier of the selected EASDF (for example, an IP address of the EASDF) to the UE. In addition, the SMF may select a UPF PSA.

In this embodiment of this application, specific implementations in which the UE starts the APP to initiate the session establishment procedure, and the SMF selects the EASDF and the UPF PSA are not limited. For details, refer to descriptions in a current conventional technology. Details are not described herein.

Further, a DNS message handling rule is created between the SMF and the EASDF. The method procedure shown in FIG. 2 further includes the following step.

S213: The SMF interacts with the EASDF to create the DNS message handling rule on the EASDF.

Specifically, the step includes the following steps:

The SMF sends a DNS context create request message (which may be, for example, Neasdf_DNSContext-_Create Request) to the EASDF; and the EASDF sends a DNS context create response message (which may be, for example, Neasdf_DNSContext-_Create Response) to the SMF.

When the DNS message handling rule needs to be updated, the method procedure shown in FIG. 2 further includes the following step.

S214: The SMF interacts with the EASDF to update the DNS message handling rule on the EASDF.

Specifically, the step includes the following steps:

The SMF sends a DNS context update request message (which may be, for example, Neasdf_DNSContext-t_Update Request) to the EASDF; and the EASDF sends a DNS context update response message (which may be, for example, Neasdf_DNSContext_Update Response) to the SMF.

It should be noted that, in this embodiment of this application, a case in which the DNS message handling rule needs to be updated is not limited, and related information used to create the DNS message handling rule on the EASDF may change, or another case may exist. Details are not described herein.

After the DNS message handling rule on the EASDF is created or updated, the method procedure shown in FIG. 2 further includes the following step.

S215: The UE sends DNS query information to the EASDF.

Specifically, the DNS query information is sent to the EASDF via a RAN and the UPF. The DNS query information carries an FQDN of the APP.

After receiving the DNS query information, the EASDF notifies the SMF according to the DNS message handling rule. The method procedure shown in FIG. 2 further includes the following steps.

S216: The EASDF sends a notification request message (which may be, for example, Neasdf_DNSContext_Notify Request) to the SMF.

The notification request message carries the FQDN of the APP.

S217: The SMF sends a notification response message (which may be, for example, Neasdf_DNSContext_Notify Response) to the EASDF.

Further, the SMF determines, based on the FQDN of the APP, EAS deployment information, a UE position, and the like, information for constructing an ECS option or information (for example, an IP address) used to determine an address of a local DNS server, and sends, to the EASDF, the information for constructing the ECS option or the address of the local DNS server.

In a possible implementation, when the EAS deployment information is a correspondence between an FQDN, an IP address (address), and a data network access identifier (DNAI), the SMF determines the information used to construct the ECS option. The information used to construct the ECS option may be an IP address. The IP address in the EAS deployment information and the information used to construct the ECS option may be in one address range, for example, an IP subnet.

In another possible implementation, when the EAS deployment information is a correspondence between an FQDN, the address of the local DNS server, and a DNAI, the SMF determines the address of the local DNS server.

The method procedure shown in FIG. 2 further includes the following step.

S218: The SMF interacts with the EASDF to update the DNS message handling rule on the EASDF.

Specifically, the step includes the following step:

The SMF sends a DNS context update request message (which may be, for example, Neasdf_DNSContex-t_Update Request) to the EASDF, where the DNS context update request message includes the information for constructing the ECS option or the address of the local DNS server; and the EASDF sends a DNS context update response message (which may be, for example, Neasdf_DNSContext_Update Response) to the SMF.

Further, the method procedure shown in FIG. 2 further includes the following steps.

S219: The EASDF sends the DNS query information to the DNS server.

Optionally, the DNS query message includes the ECS option. Alternatively, the EASDF sends the DNS query message to the local DNS server.

The ECS option may be constructed by the EASDF based on the information for constructing the ECS option, or may be constructed by the SMF based on the information for constructing the ECS option.

An entity for constructing the ECS option, a manner for constructing the ECS option, and content of the ECS option are not limited in this embodiment of this application. Subsequent embodiments of this application mainly relate to information based on which the SMF determines the information for constructing the ECS option or determines the local DNS server.

S220: The EASDF receives a DNS response message sent by the DNS server.

The DNS response message carries an EAS IP.

After receiving the EAS IP, the EASDF notifies the SMF. The method procedure shown in FIG. 2 further includes the following steps.

S221: The EASDF sends a notification request message (which may be, for example, Neasdf_DNSContext_Notify Request) to the SMF.

The notification message carries the EAS IP.

S222: The SMF sends a notification response message (which may be, for example, Neasdf_DNSContext_Notify Response) to the EASDF.

Optionally, the SMF determines a DANI based on the FQDN, the EAS IP, and the EAS deployment information, and inserts a UL CL UPF and an L-PSA at a position of the DNAI. The method procedure shown in FIG. 2 further includes the following steps.

S223: The SMF inserts the UL CL UPF and the L-PSA.

It should be noted that, a UPF (or a transmission path) selected by the SMF may not need to be changed. In other words, the UL CL UPF and the L-PSA do not need to be inserted.

S224: The SMF interacts with the EASDF to update the DNS message handling rule on the EASDF.

Specifically, the step includes the following steps:

The SMF sends a DNS context update request message (which may be, for example, Neasdf_DNSContext_Update Request) to the EASDF; and the EASDF sends a DNS context update response message (which may be, for example, Neasdf_DNSContext_Update Response) to the SMF.

S225: The EASDF sends the DNS response message to the UE.

The DNS response message carries the EAS IP.

It can be learned from the method procedure for discovering an EAS in FIG. 2 that, when determining information (for example, the information for constructing the ECS option or an identifier of the DNS server) that is for processing a DNS query and that is sent to the EASDF, the SMF considers the FQDN, the EAS deployment information (for example, a correspondence between the FQDN, the IP address, the identifier of the DNS server, and the DNAI), and the UE position. However, considering only these factors may cause a case in which an edge computing platform or an EAS corresponding to the determined information for processing the DNS query is overloaded, a case in which a platform upgrade server cannot provide a service, or another case. In these cases, a problem, for example, quality of service deterioration (for example, an increase of a response delay), service access denial, or a server connection failure occurs.

To resolve the problem existing in the method for discovering an EAS, this application provides a method for discovering an edge application server. When determining information for processing a DNS query, an SMF adds an additional consideration factor (for example, a selection weight of the EAS, a load status of the EAS, a service status of the EAS, or an EAS that cannot serve UE), to avoid a case in which an edge computing platform or an EAS corresponding to the determined information for processing the DNS query is overloaded, a case in which a platform upgrade server cannot provide a service, or another case.

It should be understood that, the method provided in embodiments of this application may be applied to a 5G communication system, for example, the communication system shown in FIG. 1. However, a scenario to which the method can be applied is not limited in embodiments of this application. For example, the method is also applicable to another network architecture including a network element that can implement a corresponding function.

To facilitate understanding of the technical solutions in embodiments of this application, before the solutions in embodiments of this application are described based on a 5G architecture, some terms or concepts in 5G that may be used in embodiments of this application are first briefly described.

1. 5G Architecture

An evolved packet system (evolved packet system, EPS) defined in the 3rd generation partnership project (3rd generation partnership project, 3GPP) includes a 5G network architecture based on a service-oriented interface or a 5G network architecture based on a point-to-point interface. A 5G network may be divided into three parts: UE, a DN, and an operator network.

The operator network may include one or more of the network elements shown in FIG. 1 other than the UE and the DN, or may further include another network element. A 5G network structure is not limited in this application. For details, refer to descriptions in a current conventional technology.

2. Edge Computing

The rapid development of mobile communication promotes continuous emergence of various new services. In addition to conventional mobile broadband and an internet of things, mobile communication has created many new application fields, such as an augmented reality (AR) technology, a virtual reality (VR) technology, an internet of vehicles technology, industrial control, and the IoT. In addition, mobile communication proposes higher requirements on performance such as network bandwidth and a network delay, and this further increases network load.

In LTE, a conventional centralized anchor deployment manner is increasingly difficult to support a rapidly increasing mobile service traffic model. In one aspect, in a network in which an anchor gateway is deployed in a centralized manner, increased traffic is finally concentrated at the gateway and a core equipment room, and this imposes increasingly high requirements on backhaul network bandwidth, an equipment room throughput, and a gateway specification. In another aspect, a long-distance backhaul network and a complex transmission environment from an access network to the anchor gateway cause a large delay and jitter of user packet transmission.

Based on the foregoing situation, edge computing is proposed in the industry. Edge computing is to move a user plane network element and a service processing capability to a network edge, to implement distributed local processing of service traffic. This avoids excessive traffic concentration, and greatly reduces specification requirements for the core equipment room and the centralized gateway. In addition, edge computing also shortens a distance of the backhaul network, and reduces an end-to-end transmission delay and jitter of a user packet, so that deployment of an ultra-low-delay service becomes possible.

Figure 3:
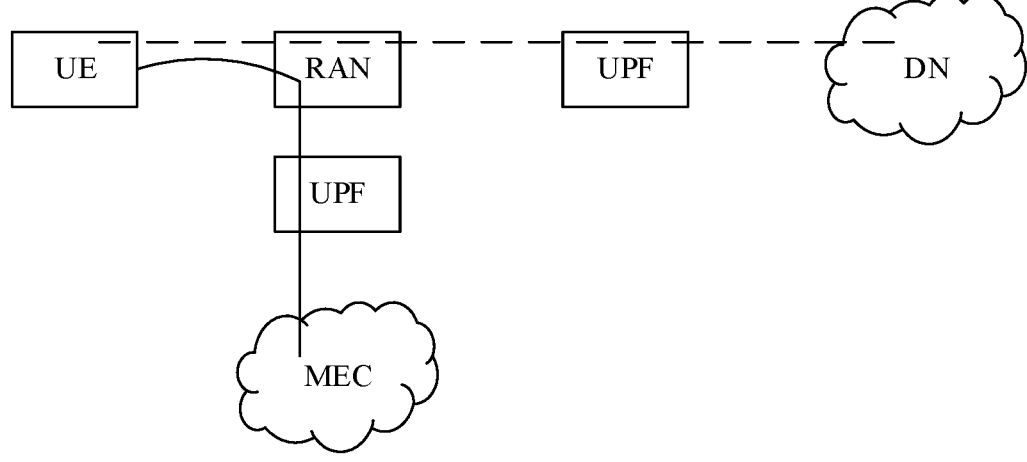
FIG. 3 is a schematic diagram of an edge computing scenario.

FIG. 3 is a schematic diagram of an edge computing scenario.

Compared with a DN network, an edge computing platform is deployed at a lower UPF (namely, a local UPF). The DN network is deployed at a remote UPF. Compared with a path (shown by a dashed line in FIG. 3) for UE to access the DN, a path (shown by a solid line in FIG. 3) for the UE to access the edge computing platform is greatly shortened. Therefore, an edge computing technology may provide low-delay and high-bandwidth services for a user.

3. DNS

With the continuous increase of a quantity of mobile phone users, service functions supported by various mobile phone terminals are continuously increasing. For example, functions such as mobile phone QQ, WeChat, Fetion, mobile phone securities, mobile phone browsing, and file download have gradually become mainstream applications of mobile phone terminals, especially, smartphones. When accessing an internet, a mobile phone needs to query for an actual IP address of a domain name of a to-be-accessed service, to send a data packet. This operation can be completed only after the UE queries a DNS server.

The DNS is a host information database that provides mapping and conversion between a domain name (domain name) and an IP address.

For example, the UE may parse the domain name to a corresponding IP address via the DNS server. In this way, the UE can access the service.

Figure 4:
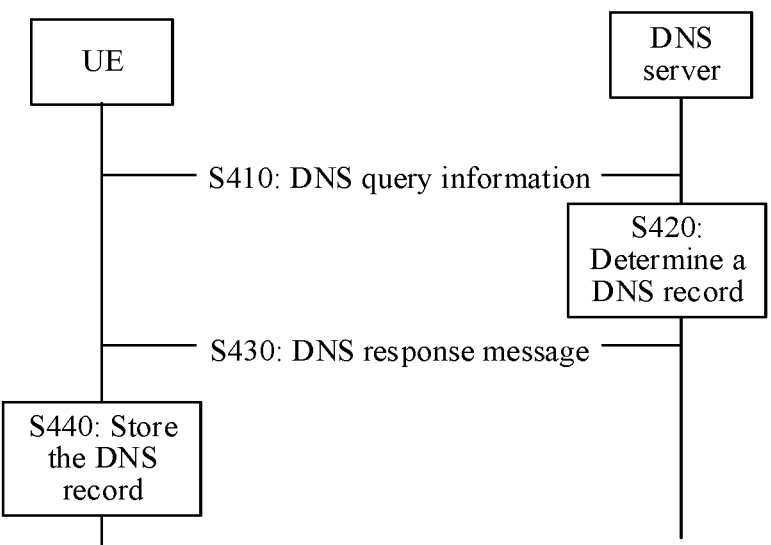
FIG. 4 is a schematic flowchart of a DNS query.

A DNS query process is shown in FIG. 4. FIG. 4 is a schematic flowchart of a DNS query. An example in which UE starts an application is used to describe a DNS query process. Specifically, before the DNS query is performed, the following steps are included.

The UE starts the application (APP).

Specifically, that the UE starts the APP includes: The UE initiates a session establishment procedure or reuses an existing session of the UE, to establish a user plane connection between the UE and a UPF. In a user plane connection establishment process, an SMF sends an address of a DNS server to the UE.

For the APP (or a service), the UE determines whether there is a DNS record related to a domain name of the service. The DNS record is a correspondence between the domain name and an IP address.

If there is the DNS record, the UE determines, based on the DNS record, the IP address corresponding to the domain name, and uses the IP address as a destination IP address of the service.

If there is no DNS record, the UE initiates the DNS query process. The process includes the following step.

S410: The UE sends a DNS query message to the DNS server.

The DNS query message carries the domain name of the service. Specifically, the DNS query message is sent to the DNS server by using the user plane connection between the UE and the UPF.

After receiving the DNS query message, the DNS server needs to determine the DNS record. A method procedure shown in FIG. 4 further includes the following step.

S420: The DNS server determines the DNS record.

Specifically, the DNS server queries a database to obtain the IP address corresponding to the domain name.

Further, after determining the DNS record, the DNS server needs to send the DNS record to the UE. The method procedure shown in FIG. 4 further includes the following step.

S430: The DNS server sends a DNS response message to the UE.

The DNS response message carries the IP address corresponding to the domain name and time to live (TTL). The TTL indicates time that the DNS record can be buffered. 0 indicates that the DNS record cannot be buffered.

Further, after receiving the DNS record, the UE may store the DNS record. The method procedure shown in FIG. 4 further includes the following step.

S440: The UE stores the DNS record.

Specifically, the UE stores the correspondence between the domain name and an IP address.

4. Load Status of an EAS

The load status of the EAS may be a comprehensive representation of system resource running statuses of the EAS. The resource running statuses may be a central processing unit (CPU) usage status, a memory usage status, an input/output (I/O) usage status, a quantity of connected users, a quantity of requested connections, bandwidth, and the like, or may be a plurality of or all of the statuses. When the resource running statuses reach a specific level, a user may not be served, or access of a new user cannot be accepted anymore. In this case, it may be considered that the EAS is overloaded (overloaded).

It may be understood that, load statuses of different EASs of a same application may be different, and different EASs of different applications may also be different. In other words, different applications may separately and independently collect statistics on load statuses of EASs corresponding to the applications. For example, when an EAS for a first application is overloaded, an EAS for a second application may be in a normal state.

5. Service Status of an EAS

The service status of the EAS may be a representation of whether the EAS can provide a service. For example, the service status of the EAS may be link unreachable, online, power-off, crash, or system upgrade.

6. Selection Weight of an EAS

The selection weight of the EAS in embodiments of this application may be understood as a selection preference and/or a selection probability of a DNAI corresponding to an edge computing platform provided by an AF, or may be understood as a selection preference and/or a selection probability of a DNAI corresponding to an edge application on the edge computing platform provided by the AF. The "preference" may be represented in a form of a priority, and the "probability" may be represented based on a number (for example, a number between 0 and 1).

For example, one DNAI corresponds to one selection weight, or one DNAI corresponds to one selection weight list, and a plurality of selection weights in the selection weight list respectively correspond to a plurality of FQDNs.

The DNAI may be understood as a user plane access identifier of a data network in which an edge computing application is deployed.

It should be noted that, in embodiments of this application, the selection weight of the EAS may also be referred to as a selection weighting factor, selection information, or the like of the EAS.

The foregoing describes, with reference to FIG. 1, a scenario to which embodiments of this application can be applied, briefly describes, with reference to FIG. 2, a defect existing in a current method for discovering an EAS, and further briefly describes basic concepts used in this application. The following describes in detail, with reference to the accompanying drawings, a method for discovering an edge application server provided in this application.

A specific structure of an execution body of the method provided in embodiments of this application is not particularly limited in the following embodiments, provided that a program that records code of the method provided in embodiments of this application can be run to perform communication according to the method provided in embodiments of this application. For example, the method provided in embodiments of this application may be performed by a core network device, or a functional module that can invoke and execute a program in the core network device.

For ease of understanding of embodiments of this application, the following several descriptions are provided.

First, in this application, "indicate" may be understood as "enable", and "enable" may include "direct enable" and "indirect enable". When it is illustrated that a piece of information is used to enable A, the information may directly enable A or indirectly enable A, but it does not indicate that the information definitely carries A.

Information to be enabled by the information is referred to as to-be-enabled information. In a specific implementation process, there are a plurality of manners of enabling the to-be-enabled information. For example, but not limited, the to-be-enabled information, for example, the to-be-enabled information itself or an index of the to-be-enabled information, may be directly enabled. Alternatively, the to-be-enabled information may be indirectly enabled by enabling other information, where there is an association relationship between the other information and the to-be-enabled information. Alternatively, only a part of the to-be-enabled information may be enabled, and other parts of the to-be-enabled information is known or agreed on in advance. For example, specific information may be enabled by using an arrangement order of pieces of information that is pre-agreed on (for example, stipulated in a protocol), to reduce enabling overheads to some extent. In addition, a common part of pieces of information can be further identified and enabled in a unified manner, to reduce enabling overheads caused by enabling a same piece of information separately.

Second, "first", "second", and various numerical numbers (for example, "#1", and "#2") shown in this application are merely for ease of description, and are used to distinguish between objects, but are not intended to limit the scope of embodiments of this application, for example, are used to distinguish between different messages, but are not used to describe a particular order or sequence. It should be understood that, the objects described in this way are interchangeable in an appropriate circumstance, so that a solution other than the solution in embodiments of this application can be described.

Third, in this application, "pre-configuration" may include predefinition, for example, definition in a protocol. The "predefinition" may be implemented by pre-storing corresponding code or a corresponding table in a device (where for example, the device includes each network element), or may be implemented in another manner that may indicate related information. A specific implementation of the "predefinition" is not limited in this application.

Fourth, "storage" used in embodiments of this application may be storage in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Fifth, "protocols" used in embodiments of this application may be standard protocols in the communication field, for example, may include a 5G protocol, a new radio (new radio, NR) protocol, and a related protocol applied to a future communication system. This is not limited in this application.

The following uses interaction between network elements as an example to describe in detail the method for discovering an edge application server provided in embodiments of this application.

Figure 5A:
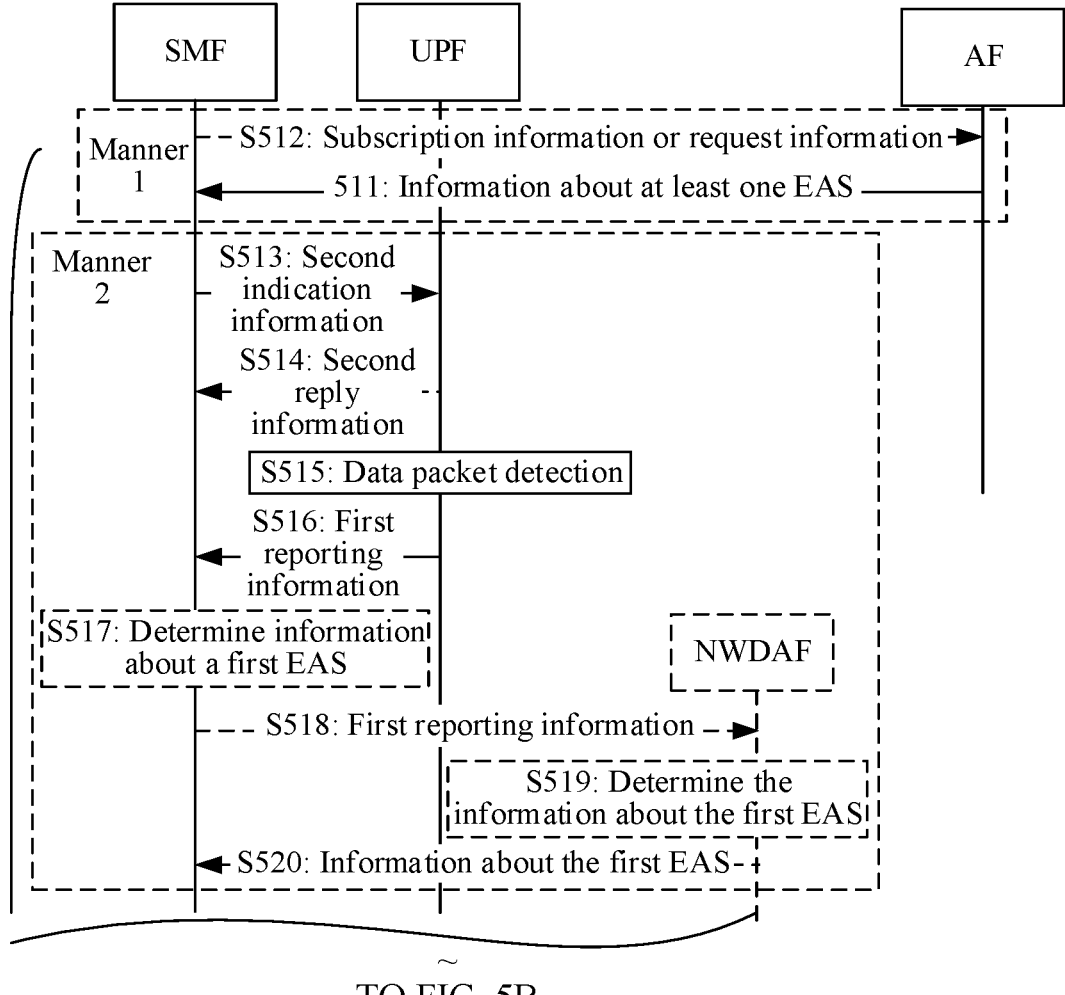
FIG. 5A and FIG. 5B are a schematic flowchart of a method for discovering an edge application server according to an embodiment of this application.
Figure 5B:
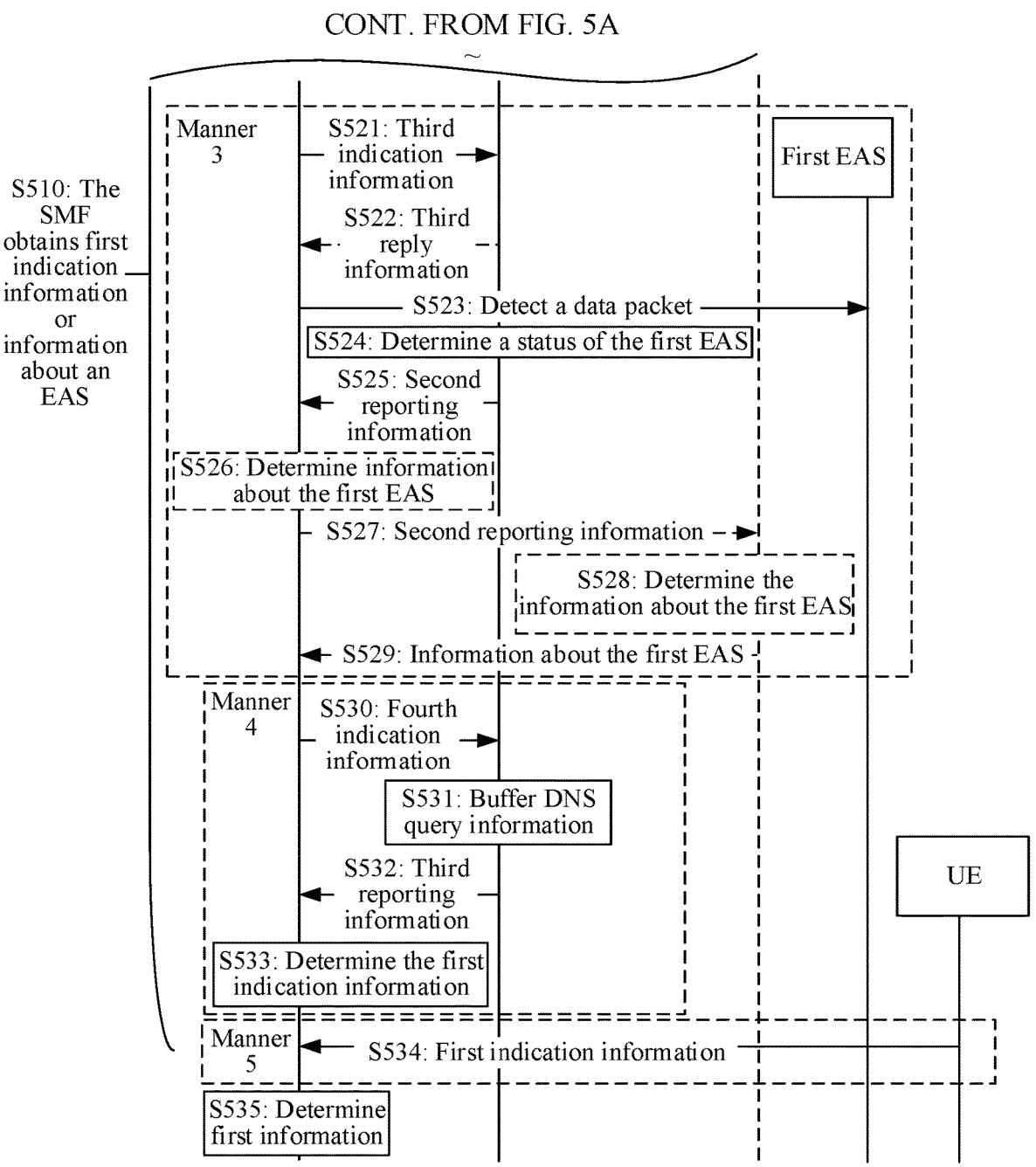

FIG. 5A and FIG. 5B are a schematic flowchart of a method for discovering an edge application server according to an embodiment of this application.

For ease of description, descriptions are provided by using an example in which a session management function network element is an SMF in a 5G network, an application function network element is an AF in the 5G network, a user plane function network element is a UPF in the 5G network, and a terminal apparatus is UE. A name of the network element or the apparatus is not limited in embodiments of this application, and another network element that can implement a corresponding function also falls within the protection scope of this application.

A procedure shown in FIG. 5A and FIG. 5B includes the following step.

S510: The SMF obtains first indication information or information about at least one edge application server EAS.

The SMF is a network element that serves a session of the terminal apparatus.

It should be noted that in this embodiment of this application, that the SMF obtains the information may be understood as that the SMF receives the information from another network element (for example, the AF), or may be understood as that the SMF determines to obtain the information. The information about the EAS indicates at least one of the following:

a load status of the EAS, a service status of the EAS, or a selection weight of the EAS.

The first indication information indicates an EAS that cannot serve the terminal apparatus.

Optionally, the information about the EAS may be indication information indicating whether the EAS is overloaded.

For example, when load of an EAS or an edge computing platform exceeds 80%, information about the EAS is sent, where the information about the EAS indicates that the EAS is overloaded; or when load of an EAS or an edge computing platform is less than 50%, information about the EAS is sent, where the information about the EAS indicates that the EAS is not overloaded (or is lightly loaded).

For another example, when resource usage of an EAS or an edge computing platform exceeds 80%, information about the EAS is sent, where the information about the EAS indicates that the EAS is overloaded; or when resource usage of an EAS or an edge computing platform is less than 50%, information about the EAS is sent, where the information about the EAS indicates that the EAS is not overloaded (or is lightly loaded).

Optionally, the information about the EAS may be a load percentage of the EAS.

For example, when load of an EAS or an edge computing platform exceeds 80%, information about the EAS is sent, where the information about the EAS indicates that the load exceeds 80%, and it may be determined, based on the information about the EAS, that the EAS is overloaded; or when load of an EAS or an edge computing platform is less than 50%, information about the EAS is sent, where the information about the EAS indicates that the load is less than 50%, and it may be determined, based on the first indication information, that the EAS is not overloaded (or is lightly loaded).

Optionally, the information about the EAS may be a resource usage percentage of the EAS.

For example, when resource usage of an EAS or an edge computing platform exceeds 80%, information about the EAS is sent, where the information about the EAS indicates that the resource usage exceeds 80%, and it may be determined, based on the information about the EAS, that the EAS is overloaded; or when resource usage of an EAS or an edge computing platform is less than 50%, information about the EAS is sent, where the information about the EAS indicates that the resource usage is less than 50%, and it may be determined, based on the information about the EAS, that the EAS is not overloaded (or is lightly loaded).

It should be understood that the foregoing is merely an example for illustrating that the information about the EAS may be the indication information indicating whether the EAS is overloaded, the load percentage of the EAS, the resource usage percentage of the EAS, or the like, and does not constitute any limitation on the protection scope of this application. Other information about the EAS that can indicate the load status of the EAS also falls within the protection scope of this application. For example, the information about the EAS is indication information indicating a quantity of APPs served by the EAS.

It can be learned from the foregoing descriptions that, the information about the EAS may be not only the indication information indicating whether the EAS is overloaded, but also the load percentage of the EAS, the resource usage percentage of the EAS, or the like. It may be understood that, if the information is the indication information indicates whether the EAS is overloaded, the information about the EAS may be sent when the EAS is overloaded; or if the information is the load percentage of the EAS or the resource usage percentage of the EAS, the information about the EAS needs to be sent when the percentage changes, and relatively, the load percentage of the EAS or the resource usage percentage of the EAS needs to be sent dynamically.

Optionally, the information about the EAS may be indication information indicating whether a link of the EAS is reachable.

For example, when a link of an EAS is unreachable, information about the EAS is sent, where the information about the EAS indicates that the link of the EAS is unreachable; or when a link of an EAS is reachable, information about the EAS is sent, where the information about the EAS indicates that the link of the EAS is reachable.

Optionally, the information about the EAS may be indication information indicating whether the EAS is online.

For example, when an EAS is offline, information about the EAS is sent, where the information about the EAS indicates that the EAS is offline; or when an EAS is online, information about the EAS is sent, where the information about the EAS indicates that the EAS is online.

Optionally, the information about the EAS may be indication information indicating whether the EAS is powered off.

For example, when an EAS is not powered off, information about the EAS is sent, where the information about the EAS indicates that the EAS is not powered off; or when an EAS is powered off, information about the EAS is sent, where the information about the EAS indicates that the EAS is powered off.

Optionally, the information about the EAS may be indication information indicating whether the EAS crashes.

For example, when an EAS does not crash, information about the EAS is sent, where the information about the EAS indicates that the EAS does not crash; or when an EAS crashes, information about the EAS is sent, where the information about the EAS indicates that the EAS crashes.

Optionally, the information about the EAS may be indication information indicating whether the EAS is in a system upgrade state.

For example, when an EAS is not in the system upgrade state, information about the EAS is sent, where the information about the EAS indicates that the EAS is not in the system upgrade state; or when an EAS is in the system upgrade state, information about the EAS is sent, where the information about the EAS indicates that the EAS is in the system upgrade state.

It should be understood that the foregoing is merely an example for illustrating that the information about the EAS may be the indication information indicating whether the link of the EAS is reachable, whether the EAS is online, whether the EAS is powered off, whether the EAS crashes, or whether the EAS is in the system upgrade state, and does not constitute any limitation on the protection scope of this application. Other information about the EAS that can indicate the service status of the EAS also falls within the protection scope of this application. For example, the information about the EAS is indication information indicating service time of the EAS.

Optionally, the information about the EAS may indicate a selection weight of a DNAI corresponding to an edge computing platform.

For example, when a selection weight of a DNAI #1 corresponding to an edge computing platform #1 is 0.4, a selection weight of a DNAI #2 corresponding to the edge computing platform #1 is 0.6, a selection weight of a DNAI #1 corresponding to an edge computing platform #2 is 0.3, and a selection weight of a DNAI #2 corresponding to the edge computing platform #2 is 0.7, information about an EAS is sent, where the information about the EAS indicates that selection weights of a DNAI #1 and a DNAI #2 that correspond to each edge application on the edge computing platform #1 are respectively 0.4 and 0.6, and indicates that selection weights of a DNAI #1 and a DNAI #2 that correspond to each edge application on the edge computing platform #2 are respectively 0.3 and 0.7.

For another example, when a selection weight of a DNAI #1 corresponding to an edge computing platform #1 is 0.4, and a selection weight of a DNAI #2 corresponding to an edge computing platform #2 is 0.6, information about an EAS is sent, where the information about the EAS indicates that a selection weight of a DNAI #1 corresponding to each edge application on the edge computing platform #1 is 0.4, and indicates that a selection weight of a DNAI #2 corresponding to each edge application on the edge computing platform #2 is 0.6.

Optionally, the information about the EAS may indicate a selection weight of a DNAI corresponding to an edge application on an edge computing platform.

For example, when selection weights of a DNAI #1 and a DNAI #2 that correspond to an edge application #1 on an edge computing platform #1 are respectively 0.1 and 0.2, selection weights of a DNAI #1 and a DNAI #2 that correspond to an edge application #2 on the edge computing platform #1 are respectively 0.1 and 0.1, selection weights of a DNAI #1 and a DNAI #2 that correspond to an edge application #1 on an edge computing platform #2 are respectively 0.4 and 0.3, and selection weights of a DNAI #1 and a DNAI #2 that correspond to an edge application #2 on the edge computing platform #2 are respectively 0.1 and 0.4, information about an EAS is sent, where the information about the EAS indicates that the selection weights of the DNAI #1 and the DNAI #2 that correspond to the edge application #1 on the edge computing platform #1 are respectively 0.1 and 0.2, indicates that the selection weights of the DNAI #1 and the DNAI #2 that correspond to the edge application #2 on the edge computing platform #1 are respectively 0.1 and 0.1, indicates that the selection weights of the DNAI #1 and the DNAI #2 that correspond to the edge application #1 on the edge computing platform #2 are respectively 0.4 and 0.3, and indicates that the selection weights of the DNAI #1 and the DNAI #2 that correspond to the edge application #2 on the edge computing platform #2 are respectively 0.1 and 0.4.

For another example, when selection weights of DNAIs #1 corresponding to an edge application #1 and an edge application #2 on an edge computing platform #1 are respectively 0.1 and 0.2, and selection weights of DNAIs #2 corresponding to an edge application #1 and an edge application #2 on an edge computing platform #2 are respectively 0.9 and 0.8, information about an EAS is sent, where the information about the EAS indicates that the selection weights of the DNAIs #1 corresponding to the edge application #1 and the edge application #2 on the edge computing platform #1 are respectively 0.1 and 0.2, and indicates that the selection weights of the DNAIs #2 corresponding to the edge application #1 and the edge application #2 on the edge computing platform #2 are respectively 0.9 and 0.8.

In a possible implementation, the selection weight may be understood as a selection probability of a corresponding DNAI. For example, the selection probability may be represented by a number between 0 and 1, and a larger value indicates a higher selection probability.

In another possible implementation, the selection weight may be understood as a selection preference (or priority) of a corresponding DNAI. For example, the selection preference may be represented by a number between 0 and 1, and a larger value indicates a higher selection priority.

In still another possible implementation, the selection weight may be understood as a selection probability and a selection preference (or priority) of a corresponding DNAI. For example, the selection probability may be represented by a number between 0 and 1, and a larger value indicates a higher selection probability. The selection preference may be represented by a number between 0 and 1, and a larger value indicates a higher selection priority. The selection weight is an average value of the selection probability and the selection preference.

Optionally, the first indication information may be an identifier of an EAS, and the identification information indicates the EAS.

For example, an identifier of an EAS may be information such as an IP address of the EAS, a name of the EAS, or an FQDN used to determine the EAS.

It should be understood that the foregoing is merely an example for describing that the first indication information may be information indicating the EAS, and does not constitute any limitation on the protection scope of this application. Other first indication information that can indicate the EAS also falls within the protection scope of this application.

In this embodiment of this application, when the SMF obtains information about a plurality of EASs, the SMF may obtain information about each EAS in some or all of the EASs.

Specifically, the SMF may obtain information about at least one EAS in a plurality of manners. The following uses a manner 1, a manner 2, a manner 3, a manner 4, and a manner 5 as examples for description. The five manners may alternatively be combined with each other.

Manner 1: The SMF obtains the information about the at least one EAS from the AF.

In the manner 1, the method procedure shown in FIG. 5A and FIG. 5B further includes the following step.

S511: The SMF receives the information about the at least one EAS from the AF, or the AF sends the information about the at least one EAS to the SMF.

The information about the at least one EAS may be information about at least one edge computing platform, the at least one EAS is deployed on the at least one edge computing platform, and the information about the at least one edge computing platform indicates the information about the at least one EAS.

For example, the edge computing platform may be understood as an EDN or an edge enabler server (edge enabler server, EES), or may be another platform on which an EAS is deployed. A specific representation form of the edge computing platform is not limited in this embodiment of this application.

For example, if the SMF obtains information about an edge computing platform (for example, a selection weight of the edge computing platform, whether the edge computing platform is overloaded, or a service status of the edge computing platform), the SMF indirectly obtains a selection weight, load information, or service status information of an EAS deployed on the edge computing platform. If an edge computing platform is overloaded, all EASs deployed on the edge computing platform are overloaded; or if an edge computing platform is in a state in which the edge computing platform cannot provide a service, all EASs deployed on the edge computing platform cannot provide a service.

Optionally, after receiving the information about the at least one EAS from the AF, the SMF may send reply information to the AF to indicate that the information about the EAS is received.

In a possible implementation, the AF may actively provide the information about the at least one EAS for the SMF.

For example, the AF may provide the information about the EAS for the SMF by using a current procedure of AF influence on traffic routing (AF influence on traffic routing).

It should be understood that, a procedure of AF influence on traffic routing is not described in detail in this embodiment of this application. For details, refer to descriptions of the current procedure of AF influence on traffic routing. A difference lies in that in this embodiment of this application, in the procedure of AF influence on traffic routing, the AF may provide the information about the at least one EAS for the SMF.

For example, the information about the EAS or the information about the edge computing platform is newly added to a message sent by the AF to the SMF in the procedure of AF influence on traffic routing.

In another possible implementation, the AF may provide the information about the at least one EAS for the SMF based on subscription information or request information of the SMF.

For example, the SMF sends the subscription information or the request information to the AF, to obtain the information about the at least one EAS. In this implementation, the method procedure shown in FIG. 5A and FIG. 5B further includes the following step.

S512: The SMF sends the subscription information or the request information to the AF, or the AF receives the subscription information or the request information from the SMF.

When the AF provides the information about the at least one EAS for the SMF based on the subscription information or the request information of the SMF, the AF may include the information about the at least one EAS in a second message that is in response to the subscription information or the request information (or collectively referred to as a first message).

It should be noted that, in the manner 1, the SMF may further obtain other information (for example, an FQDN of an APP, EAS deployment information, and a UE position) by using a current procedure (the procedure shown in FIG. 2). The other information and the information that is about the at least one edge application server EAS and that is obtained in the manner 1 are used to determine information for constructing an ECS option or used to determine an address of a local DNS server. The following provides descriptions with reference to specific embodiments. Details are not described herein.

Manner 2: The SMF determines the information about the at least one EAS based on a data packet detection result obtained from the UPF.

In the manner 2, the method procedure shown in FIG. 5A and FIG. 5B further includes the following step.

S513: The SMF sends second indication information to the UPF, or the UPF receives the second indication information from the UPF.

The second indication information indicates the UPF to detect a first data packet, and a destination IP address of the first data packet is an IP address of a first EAS (or the first data packet is a data packet whose destination IP address is the IP address of the first EAS).

Optionally, the UPF is an L-PSA UPF, or the UPF is a UL CL UPF.

It should be noted that, the first EAS is any one of the at least one EAS. In other words, the SMF may indicate, by using the indication information, the UPF to separately detect data packets whose destination IP addresses are IP addresses of different EASs.

For example, the SMF may respectively indicate, by using a plurality of pieces of second indication information, the UPF to detect different data packets. Specifically, the SMF indicates, by using second indication information #1, the UPF to detect a first data packet #1, where an IP address of the first data packet #1 is an IP address of a first EAS #1; and the SMF indicates, by using second indication information #2, the UPF to detect a first data packet #2, where an IP address of the first data packet #2 is an IP address of a first EAS #2. The first EAS #1 and the first EAS #2 are different EASs.

For ease of description, an example in which the SMF obtains information about an EAS is used for description.

The second indication information includes the IP address of the first EAS and detection indication information.

For example, the detection indication information may indicate the UPF to perform deep packet inspection (Deep Packet Inspection, DPI) on a packet related to the first EAS.

For example, the detection indication information may further indicate the UPF to detect and report information such as access traffic information of the first EAS and round-trip delay information of the first data packet between the UPF and the first EAS.

In a possible implementation, the SMF may send the second indication information to the UPF by using an N4 session establishment request.

In another possible implementation, the SMF may send the second indication information to the UPF by using an N4 session modification request.

It should be understood that the foregoing is merely an example for describing a manner in which the SMF can send the second indication information to the UPF, and does not constitute any limitation on the protection scope of this application. Another manner in which the SMF sends the second indication information to the UPF also falls within the protection scope of this application. For example, the SMF actively sends the second indication information to the UPF. For another example, that the SMF needs to send the second indication information to the UPF is predefined in a protocol. For still another example, the SMF sends the second indication information to the UPF based on an indication of another device (for example, a management device). Examples are not described herein one by one.

Optionally, after the UPF receives the second indication information, the UPF may send second reply information to the SMF in response to receiving the second indication information. The method procedure shown in FIG. 5A and FIG. 5B further includes the following step.

S514: The UPF sends the second reply information to the SMF, or the SMF receives the second reply information from the UPF.

Optionally, when the SMF sends the second indication information to the UPF by using the N4 session establishment request, the UPF may send the second reply information to the SMF by using an N4 session establishment reply.

Optionally, when the SMF sends the second indication information to the UPF by using the N4 session modification request, the UPF may send the second reply information to the SMF by using an N4 session modification reply.

It should be understood that the foregoing is merely an example for describing a manner in which the UPF can send the second reply information to the SMF, and does not constitute any limitation on the protection scope of this application. Another manner in which the UPF sends the second reply information to the SMF also falls within the protection scope of this application. Examples are not described herein one by one.

In addition, after receiving the second indication information, the UPF may alternatively not send the second reply information.

Specifically, after receiving the second indication information, the UPF performs data packet detection based on the second indication information. The method procedure shown in FIG. 5A and FIG. 5B further includes the following step.

S515: The UPF performs data packet detection.

Specifically, the UPF collects statistics on the information such as the access traffic information of the first EAS and the round-trip delay (or transmission delay) information of the first data packet between the UPF and the first EAS based on an indication of the SMF.

In a possible implementation, the UPF may obtain a round-trip delay by detecting two corresponding first data packets (where a destination IP address of one first data packet is the IP address of the first EAS, and a source IP address of the other first data packet is the IP address of the first EAS).

The foregoing is merely an example for describing a possible manner of obtaining the delay through detection, and does not constitute any limitation on the protection scope of this application. How to obtain the delay through detection is not limited in this embodiment of this application.

It should be noted that a prerequisite for the UPF to perform first data packet detection is that first data packet transmission is performed between the UE and the first EAS.

In a possible implementation, the UE that performs first data packet transmission with the first EAS is other UE (UE other than UE that currently performs EAS discovery).

In another possible implementation, after UE that currently performs EAS discovery discovers an EAS, the UE that performs first data packet transmission with the first EAS is the current UE.

Further, after performing data packet detection, the UPF needs to send a detection result to the SMF. The method procedure shown in FIG. 5A and FIG. 5B further includes the following step.

S516: The UPF sends first reporting information to the SMF, or the SMF receives the first reporting information from the UPF.

The first reporting information includes a detection result of the first data packet, and the detection result includes the access traffic information of the first EAS, the round-trip delay information of the first data packet between the UPF and the first EAS, and the like.

Optionally, the first reporting information may further include the IP address of the first EAS, or the SMF locally stores the IP address of the first EAS, and the UPF does not need to report the IP address of the first EAS by using the first reporting information.

Optionally, the UPF may send the first reporting information to the SMF by using an N4 session.

The following provides descriptions by using an example in which the first reporting information is used to determine information about the first EAS. Information about another EAS may further be determined based on the first reporting information. For example, the second indication information indicates the UPF to detect the first data packet #2, and the first data packet #2 is a data packet whose destination IP address is the IP address of the first EAS #2. The SMF may determine information about the first EAS #1 based on the first reporting information. A determining manner is similar to a manner in which the SMF determines the information about the first EAS. Details are not described herein again.

Specifically, after receiving the first reporting information, the SMF determines the information about the at least one EAS based on the first reporting information.

In a possible implementation, the SMF directly determines the information about the first EAS based on the first reporting information. In this implementation, the method procedure shown in FIG. 5A and FIG. 5B further includes the following step.

S517: The SMF determines the information about at least one EAS based on the first reporting information.

For example, that the SMF determines the information about the first EAS based on the first reporting information includes: The SMF determines a load status of the first EAS based on the access traffic information of the first EAS. If access traffic of the first EAS is large (for example, exceeds a preset upper overload threshold), it is determined that the load status of the first EAS is an overload state; or if access traffic of the first EAS is small (for example, is less than a preset lower overload threshold), it is determined that the load status of the first EAS is a light load state.

For example, that the SMF determines the information about the first EAS based on the first reporting information further includes: The SMF determines a service status of the first EAS based on the round-trip delay information of the first data packet between the UPF and the first EAS. If a round-trip delay is large (for example, exceeds a preset upper delay threshold), it is determined that the service status of the first EAS is that the first EAS cannot provide a service; or if a round-trip delay is small (for example, is less than a preset lower delay threshold), it is determined that the service status of the first EAS is that the first EAS can provide a service.

In another possible implementation, the SMF may send the received first reporting information to an NWDAF, and the NWDAF performs data analysis to determine the information about the first EAS, and sends the information about the first EAS to the SMF. In this implementation, the method procedure shown in FIG. 5A and FIG. 5B further includes the following steps.

S518: The SMF sends the first reporting information to the NWDAF, or the NWDAF receives the first reporting information from the SMF.

S519: The NWDAF determines the information about the first EAS.

Specifically, the NWDAF performs data analysis based on the first reporting information to determine the information about the first EAS.

For example, that the NWDAF determines the information about the first EAS based on the first reporting information includes: The NWDAF determines a load status of the first EAS based on the access traffic information of the first EAS. If access traffic of the first EAS is large (where for example, this is a conclusion obtained by using a data analysis function), it is determined that the load status of the first EAS is an overload state; or if access traffic of the first EAS is small (where for example, this is a conclusion obtained by using a data analysis function), it is determined that the load status of the first EAS is a light load state.

For example, that the NWDAF determines the information about the first EAS based on the first reporting information further includes: The SMF determines a service status of the first EAS based on the round-trip delay information of the first data packet between the UPF and the first EAS. If a round-trip delay is large (where for example, this is a conclusion obtained by using a data analysis function), it is determined that the service status of the first EAS is that the first EAS cannot provide a service; or if a round-trip delay is small (where for example, this is a conclusion obtained by using a data analysis function), it is determined that the service status of the first EAS is that the first EAS can provide a service.

Further, the NWDAF sends the information about the first EAS to the SMF. The method procedure shown in FIG. 5A and FIG. 5B further includes the following step.

S520: The NWDAF sends the information about the first EAS to the SMF.

It should be understood that, a specific manner of determining the information about the at least one EAS based on the first reporting information is not limited in this embodiment of this application, and all manners that can be used to determine the information about the EAS based on the data packet detection result reported by the UPF fall within the protection scope of this application.

It should be noted that, in the manner 2, the SMF may further obtain other information (for example, an FQDN of an APP, EAS deployment information, and a UE position) by using a current procedure (the procedure shown in FIG. 2). The other information and the information that is about the at least one edge application server EAS and that is obtained in the manner 2 are used to determine information for constructing an ECS option or used to determine an address of a local DNS server. The following provides descriptions with reference to specific embodiments. Details are not described herein.

Manner 3: The SMF determines the information about the at least one EAS based on a network detection result obtained from the UPF.

In the manner 3, the method procedure shown in FIG. 5A and FIG. 5B further includes the following step.

S521: The SMF sends third indication information to the UPF, or the UPF receives the third indication information from the UPF.

The third indication information indicates the UPF to perform network detection to determine a status of a first EAS.

Optionally, the UPE is an L-PSA UPF, or the UPF is a UL CL UPF.

It should be noted that, the first EAS may be any one of the at least one EAS. In other words, the SMF may indicate, by using the indication information, the UPF to separately determine statuses of different EASs.

For example, the SMF indicates, by using third indication information #1, the UPF to determine a status of a first EAS #1; and the SMF indicates, by using third indication information #2, the UPF to determine a status of a first EAS #2. The first EAS #1 and the first EAS #2 are different EASs.

For ease of description, an example in which the SMF obtains information about an EAS is used for description.

For example, the third indication information includes an IP address of the first EAS.

For example, the third indication information may not include the IP address of the first EAS, and the third indication information triggers the UPF to perform network detection.

In a possible implementation, the SMF may send the third indication information to the UPF by using an N4 session establishment request.

In another possible implementation, the SMF may send the third indication information to the UPF by using an N4 session modification request.

It should be understood that the foregoing is merely an example for describing a manner in which the SMF can send the third indication information to the UPF, and does not constitute any limitation on the protection scope of this application. Another manner in which the SMF sends the third indication information to the UPF also falls within the protection scope of this application. For example, the SMF actively sends the third indication information to the UPF. For another example, that the SMF needs to send the third indication information to the UPF is predefined in a protocol. For still another example, the SMF sends the third indication information to the UPF based on an indication of another device (for example, a management device). Examples are not described herein one by one.

Optionally, after the UPF receives the third indication information, the UPF may send third reply information to the SMF in response to receiving the third indication information. The method procedure shown in FIG. 5A and FIG. 5B further includes the following step.

S522: The UPF sends the third reply information to the SMF, or the SMF receives the third reply information from the UPF.

Optionally, when the SMF sends the third indication information to the UPF by using the N4 session establishment request, the UPF may send the third reply information to the SMF by using an N4 session establishment reply.

Optionally, when the SMF sends the third indication information to the UPF by using the N4 session modification request, the UPF may send the third reply information to the SMF by using an N4 session modification reply.

It should be understood that the foregoing is merely an example for describing a manner in which the UPF can send the third reply information to the SMF, and does not constitute any limitation on the protection scope of this application. Another manner in which the UPF sends the third reply information to the SMF also falls within the protection scope of this application. Examples are not described herein one by one.

In addition, after receiving the third indication information, the UPF may alternatively not send the third reply information.

Specifically, after receiving the third indication information, the UPF performs network detection based on the third indication information. The method procedure shown in FIG. 5A and FIG. 5B further includes the following step.

S523: The UPF sends a detection data packet to the first EAS, or the first EAS receives the detection data packet from the UPF.

The detection data packet is used to detect the status of the first EAS.

For example, the detection data packet may be a Ping packet, a transmission control protocol (TCP) port detection packet, or a hypertext transfer protocol (HTTP) uniform resource locator (URL) detection packet.

When the detection data packet is the Ping packet, conditions of a server and a network system are detected in a Ping manner, and whether a network and an operating system on the server are normal can be roughly detected. When the detection data packet is the TCP port detection packet, whether a service is normal is determined by detecting whether a TCP port on the server is exposed, for example, detecting a TCP port corresponding to an edge computing service. When the detection data packet is the HTTP URL detection packet, in a content-based automated testing principle, an access request for a hypertext markup language (hypertext markup language, html) (for example, main.html) file is sent to an HTTP server, and if an error message is received, the server is considered to be faulty.

Specifically, the UPF calculates and determines the status of the first EAS based on whether the first EAS replies with a data packet and information in the replied data packet. The method procedure shown in FIG. 5A and FIG. 5B further includes the following step.

S524: The UPF determines the status of the first EAS.

For example, if the UPF receives no corresponding replied data packet after sending the Ping packet to the first EAS, or receives an error indication, it is considered that the UPF cannot obtain a service of the first EAS (or the edge computing platform), and the status of the first EAS (or the edge computing platform) may be a link unreachable state.

For another example, if the UPF receives, after sending the TCP port detection packet to the first EAS, a replied data packet indicating that a port is unreachable, it indicates that the status of the first EAS may be that the first EAS (or a corresponding edge computing service) is unavailable, or the first EAS is overloaded.

For still another example, the UPF sends the access request for the main.html file to the HTTP server. If error information is received, it is considered that the status of the first EAS may be that the corresponding first EAS is faulty and may be in a state in which the first EAS cannot provide a service.

It should be noted that the foregoing descriptions are provided by using an example in which the UPF detects the status of the first EAS. The UPF may further detect statuses of a plurality of EASs (for example, the UPF separately sends the detection data packet to the plurality of EASs), or may further detect a status of an edge computing platform (for example, the UPF sends the detection data packet to an EAS deployed on the edge computing platform). A specific detection manner is the same as a manner in which the UPF determines the status of the first EAS. Details are not described again.

Further, the UPF needs to report the status of the first EAS to the SMF, and the SMF determines information about the first EAS. The method procedure shown in FIG. 5A and FIG. 5B further includes the following step.

S525: The UPF sends second reporting information to the SMF, or the SMF receives the second reporting information from the UPF.

The second reporting information includes indication information indicating the status of the first EAS.

Optionally, the second reporting information may further include the IP address of the first EAS, or the SMF locally stores the IP address of the first EAS, and the UPF does not need to report the IP address of the first EAS by using the first reporting information.

Optionally, the UPF may send the second reporting information to the SMF by using an N4 session.

The following provides descriptions by using an example in which the second reporting information is used to determine the information about the first EAS. Information about another EAS may further be determined based on the second reporting information. For example, the third indication information indicates the UPF to determine the status of the first EAS #2. The SMF may determine information about the first EAS #2 based on the second reporting information. A determining manner is similar to a manner in which the SMF determines the information about the first EAS. Details are not described herein again.

Specifically, after receiving the second reporting information, the SMF determines the information about the at least one EAS based on the second reporting information.

In a possible implementation, the SMF directly determines the information about the first EAS based on the second reporting information. In this implementation, the method procedure shown in FIG. 5A and FIG. 5B further includes the following step.

S526: The SMF determines the information about at least one EAS based on the second reporting information.

For example, that the SMF determines information about the first EAS based on the second reporting information includes: The SMF determines a load status of the first EAS based on the status of the first EAS.

For example, that the SMF determines the information about the first EAS based on the first reporting information further includes: The SMF determines a service status of the first EAS based on the status of the first EAS.

In another possible implementation, the SMF may send the received second reporting information to an NWDAF, and the NWDAF performs data analysis to determine the information about the first EAS, and sends the information about the first EAS to the SMF. In this implementation, the method procedure shown in FIG. 5A and FIG. 5B further includes the following steps.

S527: The SMF sends the second reporting information to the NWDAF, or the NWDAF receives the second reporting information from the SMF.

S528: The NWDAF determines the information about the first EAS.

Specifically, the NWDAF performs data analysis based on the second reporting information to determine the information about the first EAS.

For example, that the NWDAF determines the information about the first EAS based on the second reporting information includes: The NWDAF determines a load status of the first EAS based on the status of the first EAS.

For example, that the NWDAF determines the information about the first EAS based on the first reporting information further includes: The NWDAF determines a service status of the first EAS based on the status of the first EAS.

Further, the NWDAF sends the information about the first EAS to the SMF. The method procedure shown in FIG. 5A and FIG. 5B further includes the following step.

S529: The NWDAF sends the information about the first EAS to the SMF.

It should be understood that, a specific manner of determining the information about the at least one EAS based on the second reporting information is not limited in this embodiment of this application, and all manners that can be used to determine the information about the EAS based on the network detection result reported by the UPF fall within the protection scope of this application.

It should be noted that, in the manner 3, the SMF may further obtain other information (for example, an FQDN of an APP, EAS deployment information, and a UE position) by using a current procedure (the procedure shown in FIG. 2). The other information and the information that is about the at least one edge application server EAS and that is obtained in the manner 3 are used to determine information for constructing an ECS option or used to determine an address of a local DNS server. The following provides descriptions with reference to specific embodiments. Details are not described herein.

Specifically, the SMF may obtain the first indication information in the following manner. The first indication information indicates an EAS that cannot serve the terminal apparatus. It should be understood that the EAS that cannot serve the UE is an EAS that has been determined (for example, attempted by the UE) to serve the UE.

Manner 4: The SMF determines the first indication information based on information about a DNS query obtained from the UPF.

In the manner 4, the method procedure shown in FIG. 5A and FIG. 5B further includes the following steps.

S530: The SMF sends fourth indication information to the UPF, or the UPF receives the fourth indication information from the UPF.

The fourth indication information indicates the UPF to buffer DNS query information for a first FQDN from a terminal apparatus that currently needs to perform EAS discovery.

It should be noted that, the DNS query information for the first FQDN from the terminal apparatus may be understood as DNS query information re-initiated after the terminal apparatus attempts to obtain an edge computing service based on an EAS IP carried in a DNS response message (for example, step S225 shown in FIG. 2) and cannot obtain the edge computing service.

For example, the SMF sends the fourth indication information to the UPF in a procedure of inserting a UL CL UPF and an L-PSA UPF (for example, step S223 shown in FIG. 2), and before performing the procedure, the SMF has known information such as an IP address and a DNAI of a second EAS.

Optionally, the SMF may send the information such as the IP address and the DNAI of the second EAS to the UPF by using the fourth indication information.

S531: The UPF detects the DNS query information, and buffers the DNS query information.

Specifically, the UPF receives the DNS query information re-initiated by the UE, and buffers the DNS query information.

S532: The UPF sends third reporting information to the SMF, or the SMF receives the third reporting information from the UPF.

The third reporting information includes the first FQDN, the IP address and the DNAI of the second EAS, and the like.

Optionally, when the fourth indication information includes the information such as the IP address and the DNAI of the second EAS, the third reporting information may further include the information such as the IP address and the DNAI of the second EAS, or the SMF locally stores the information such as the IP address and the DNAI of the second EAS, and the UPF does not need to report the information such as the IP address and the DNAI of the second EAS by using the third reporting information.

Specifically, after receiving the third reporting information, the SMF determines the first indication information based on the third reporting information.

The method procedure shown in FIG. 5A and FIG. 5B further includes the following step.

S533: The SMF determines the first indication information.

The first indication information is indication information of an EAS that cannot serve the terminal apparatus.

It should be noted that, in the manner 4, the SMF further needs to indicate the UPF to forward the buffered DNS query information to an EASDF, and obtain other information (for example, an FQDN of an APP, EAS deployment information, and a UE position). The other information and the first indication information obtained in the manner 4 are used to determine information for constructing an ECS option or used to determine an address of a local DNS server. The following provides descriptions with reference to specific embodiments. Details are not described herein.

Manner 5: The SMF receives the first indication information from the UE.

In the manner 5, the method procedure shown in FIG. 5A and FIG. 5B further includes the following step.

S534: The UE sends the first indication information to the SMF, or the SMF receives the first indication information from the UE.

The first indication information indicates a third EAS that cannot serve the UE.

For example, the first indication information may indicate that the third EAS cannot provide a service.

For another example, the first indication information may indicate the third EAS that cannot provide a service.

For example, the first indication information includes an IP of the third EAS, and the third EAS is an EAS that cannot serve a terminal apparatus that currently performs EAS discovery.

Optionally, the first indication information may further include an FQDN, a timer, and the like.

For example, an EAS indicated in a DNS response message received by the terminal apparatus cannot provide an edge computing service for the terminal apparatus, and the terminal apparatus resends a DNS query message. Before resending the DNS query message, the terminal apparatus reports the first indication information to the SMF by using a NAS message, where the first indication information includes an EAS IP (indicated in a DNS response), the FQDN, the timer, and the like.

Specifically, after receiving the first indication information, the SMF determines, based on the first indication information, the third EAS that cannot provide the edge computing service for the terminal apparatus.

It should be noted that, in the manner 5, the SMF may further obtain other information (for example, an FQDN of an APP, EAS deployment information, and a UE position) by using a current procedure (the procedure shown in FIG. 2). The other information and the first indication information obtained in the manner 5 are used to determine information for constructing an ECS option or used to determine an address of a local DNS server. The following provides descriptions with reference to specific embodiments. Details are not described herein.

In addition, the manners of determining the first indication information shown in the manner 4 and the manner 5 may be performed after the information about the EAS is determined in any one of the manners shown in the foregoing manner 1 to manner 3. For example, after the information about the EAS is determined based on the manner shown in the foregoing manner 1, if a selected EAS still cannot serve the UE, the EAS that cannot serve the UE may be reported in the manner shown in the manner 4 or the manner 5.

Manners in which the SMF obtains the information about the EAS are described in detail in the foregoing manner 1 to the manner 3, and manners in which the SMF obtains the first indication information are described in the manner 4 and the manner 5. After the first indication information or the information about the EAS is obtained, the method procedure shown in FIG. 5A and FIG. 5B further includes the following step.

S535: The SMF determines first information.

Specifically, the SMF determines the first information based on the obtained first indication information or the obtained information about the EAS.

Alternatively, after obtaining the first indication information and the information about the EAS, S535 is performed. In other words, the SMF may determine the first information based on at least one of the obtained first indication information and the obtained information about the EAS.

The first information is used to determine the information for constructing the ECS option, or the first information is used to determine the address of the local domain name system DNS server.

Different from determining the information for constructing the ECS option or determining the address of the local DNS server shown in FIG. 2, the SMF may determine the first information based on the information such as the FQDN of the APP, the EAS deployment information, and the UE position, and the obtained first indication information or the obtained information about the EAS. The first information is used to determine the information for constructing the ECS option, or the first information is used to determine the address of the local DNS server.

For example, the first information may be information used to determine to construct the ECS option, or information used to determine the address of the local DNS server. For example, the first information may be a DNAI, and the information for constructing the ECS option is determined based on the DNAI, or the address of the local DNS server is determined based on the DNAI.

For example, the first information may be information about the ECS option, or the address of the local DNS server.

In this embodiment of this application, specific forms of the information for constructing the ECS option and the address of the local DNS server are not limited. For details, refer to related descriptions in a current protocol. In this application, in a main procedure in which the SMF determines the information about the ECS option and the address of the local DNS server, in addition to information (for example, the information such as the FQDN of the APP, the EAS deployment information, and the UE position) specified in the current protocol, additional information (for example, the first indication information and/or the information about the EAS) further needs to be considered. In this way, a case in which an edge computing platform or an EAS corresponding to the ECS option or the address of the local DNS server is overloaded, a case in which an EAS upgrade server cannot provide a service, or another case can be avoided.

For example, in the foregoing manner 1, the AF provides the information about the EAS, so that the determined information for constructing the ECS option or the determined address of the local DNS server does not correspond to an EAS that is overloaded or cannot provide a service, to avoid a problem that quality of service deteriorates or the edge computing service cannot be obtained.

For another example, in the foregoing manner 2, the UPF performs data packet detection and message reporting, and the SMF obtains the information about the EAS, so that the determined information for constructing the ECS option or the determined address of the local DNS server does not correspond to an EAS that is overloaded or cannot provide a service, to avoid a problem that quality of service deteriorates or the edge computing service cannot be obtained.

For still another example, in the foregoing manner 3, the UPF performs network detection and message reporting, and the SMF obtains the information about the EAS, so that the determined information for constructing the ECS option or the determined address of the local DNS server does not correspond to an EAS that is overloaded or cannot provide a service, to avoid a problem that quality of service deteriorates or the edge computing service cannot be obtained.

For still another example, in the foregoing manner 4, the SMF indicates the UPF to buffer the DNS query message and report data. A message reported by the UPF to the SMF includes information about the EAS that cannot provide the edge computing service for the UE. Therefore, when the SMF determines the information for constructing the ECS option or the address of the local DNS server, the EAS that cannot provide the edge computing service is avoided.

For still another example, in the foregoing manner 5, the UE reports EAS service information to the SMF by using the NAS message, where the EAS service information includes information about the EAS that cannot provide the edge computing service for the UE. Therefore, when the SMF determines the information for constructing the ECS option or the address of the local DNS server, the EAS that cannot provide the edge computing service is avoided.

In addition, that the session management function network element determines the first information based on the obtained first indication information or the obtained information about the edge application server may be further understood as follows: The session management function network element determines the first information based on at least the first indication information or the information about the edge application server. The session management function network element may further comprehensively determine the first information based on one or more of information such as the FQDN of the APP, the EAS deployment information (for example, a correspondence between the FQDN, the IP address, and the DNAI), and the UE position shown in FIG. 2.

It should be understood that, in the method for discovering an edge application server provided in this embodiment of this application, when determining the information for constructing the ECS option or the address of the local DNS server, the SMF considers the information that is about the EAS and that indicates the selection weight of the EAS, the load status of the EAS, or the service status of the EAS, or the first indication information indicating the EAS that cannot serve the terminal apparatus. This can avoid a case in which an edge computing platform or an EAS corresponding to the information about the ECS option or the address of the local DNS server is overloaded, a case in which an EAS upgrade server cannot provide a service, or another case. Therefore, deterioration of quality of service of the EAS is avoided.

In addition, when statuses or load of a plurality of EASs is considered, an EAS with better quality of service may be selected, so that the quality of service of the EAS can be improved.

Further, in the method for discovering an edge application server provided in this embodiment of this application, when determining the information for constructing the ECS option or the address of the local DNS server, the SMF not only considers the information that is about the EAS and that indicates the selection weight of the EAS, the load status of the EAS, or the service status of the EAS, or the first indication information indicating the EAS that cannot serve the terminal apparatus, but also considers the information such as the FQDN of the APP, the EAS deployment information (for example, the correspondence between the FQDN, the IP address, and the DNAI), and the UE position shown in FIG. 2.

For ease of understanding, the following describes, in detail with reference to specific embodiments, an EAS discovery procedure in embodiments of this application.

Figure 6:
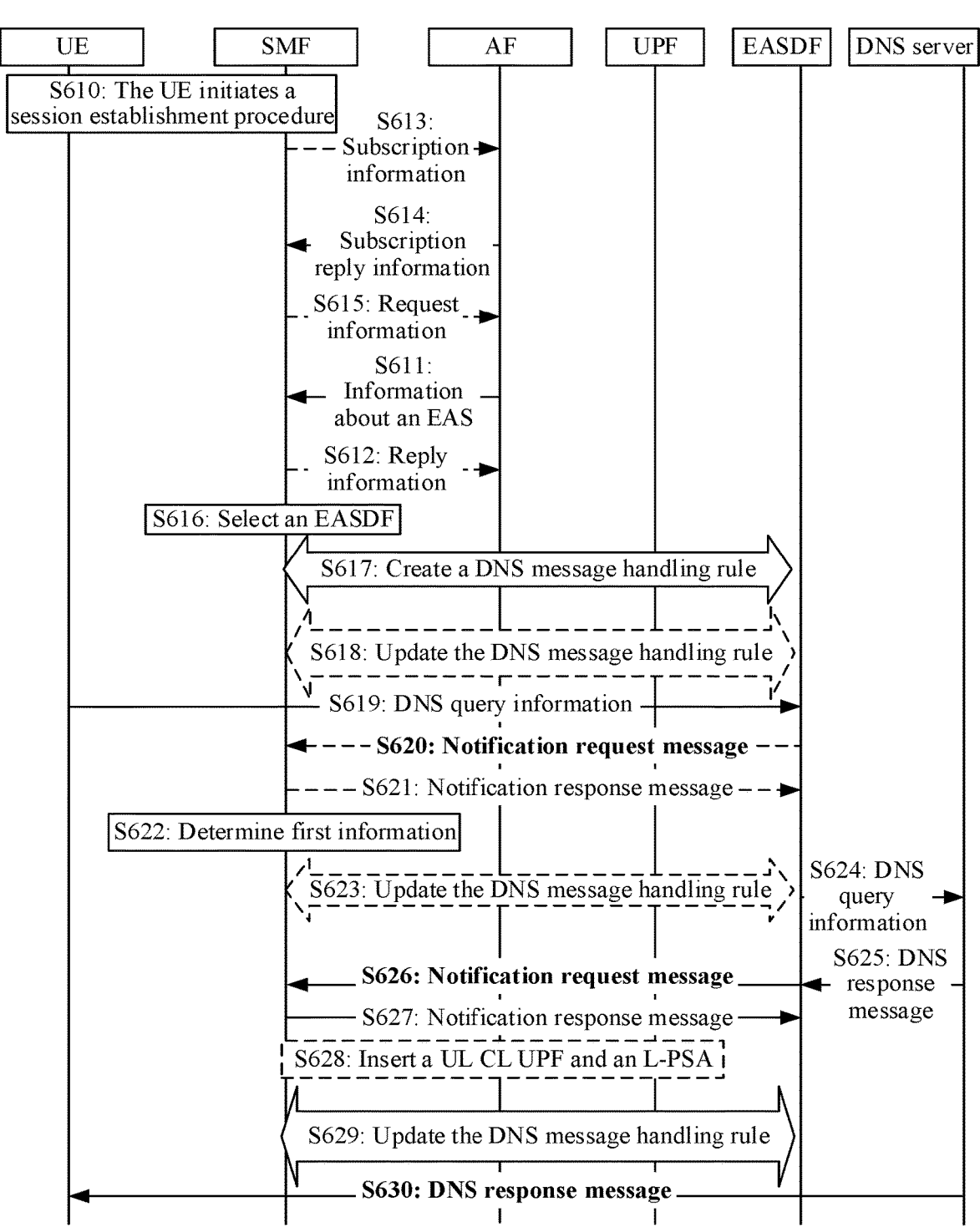
FIG. 6 is a schematic flowchart of a method for discovering an edge application server.

FIG. 6 is a schematic flowchart of a method for discovering an edge application server. The method includes the following step.

S610: UE initiates a session establishment procedure.

Specifically, the UE starts an APP to initiate the session establishment procedure or reuses an existing session of the UE, to establish a user plane connection between the UE and a UPF.

In the method shown in FIG. 6, an SMF needs to obtain information about the EAS from an AF. A method procedure shown in FIG. 6 further includes the following step.

S611: The AF sends the information about the EAS to the SMF.

The information about the EAS includes information such as a selection weight of the EAS (or an edge computing platform), a load status of the EAS (or the edge computing platform), and a service status of the EAS (or the edge computing platform).

For details about the information about the EAS, refer to the foregoing descriptions of S511. Details are not described herein again.

Optionally, after receiving the information about the EAS, the SMF may send reply information to the AF to indicate that the information about the EAS is received.

The method procedure shown in FIG. 6 further includes the following step.

S612: The SMF sends the reply information to the AF.

In a possible implementation, the AF may actively send the information about the EAS to the SMF. For example, the information about the EAS is provided for the SMF in a procedure of AF influence on traffic routing.

In another possible implementation, the AF may provide the information about the EAS for the SMF based on subscription information of the SMF. In this implementation, the method procedure shown in FIG. 6 further includes the following step.

S613: The SMF sends the subscription information to the AF.

Specifically, when obtaining EAS deployment information, the SMF needs to obtain corresponding AF information. The SMF obtains a corresponding DNAI based on an FQDN and UE position information. The SMF subscribes EAS-related information from the AF corresponding to the DNAI.

The subscription information may carry information such as the FQDN, the UE position information, and a UE identifier. A plurality of FQDNs and/or information about EASs corresponding to a plurality of UEs may be subscribed to. In this case, the subscription information may carry at least one FQDN, at least one piece of UE position information, or at least one UE identifier.

Optionally, the AF may send subscription reply information to the SMF after receiving the subscription information, to indicate that the subscription information is received.

The method procedure shown in FIG. 6 further includes the following step.

S614: The AF sends the subscription reply information to the SMF.

When a notification condition is met, the foregoing step S611 is performed. The AF notifies the SMF of the information about the EAS, where the information about the EAS includes the FQDN, the UE identifier, the load status of the EAS (or the edge computing platform), the service status of the EAS (or the edge computing platform), and the like.

In still another possible implementation, the AF may provide the information about the EAS for the SMF based on request information of the SMF. In this implementation, the method procedure shown in FIG. 6 further includes the following step.

S615: The SMF sends the request information to the AF.

Specifically, when obtaining EAS deployment information, the SMF needs to obtain corresponding AF information. The SMF obtains a corresponding DNAI based on an FQDN and UE position information. The SMF requests EAS-related information from the AF corresponding to the DNAI.

The request information may carry information such as the FQDN, the UE position information, and a UE identifier. The information such as the FQDN, the UE position information, and the UE identifier is information related to UE that currently needs to perform EAS discovery.

After receiving the request information, the AF performs the foregoing step S611. The AF replies the information about the EAS to the SMF, where the information about the EAS includes the FQDN, the UE identifier, the load status of the EAS (or the edge computing platform), the service status of the EAS (or the edge computing platform), and the like.

It should be noted that, when a manner in which the SMF obtains the information about the EAS from the AF is that the AF actively sends the information to the SMF, or is based on the subscription information of the SMF, the foregoing steps S611, S612, S613, and S614 may be performed in the session establishment procedure. When the manner in which the SMF obtains the information about the EAS from the AF is that the AF actively sends the information to the SMF, or is based on the subscription information of the SMF, the foregoing steps S611, S612, and S615 may be performed in a DNS message handling rule update procedure.

Further, the method procedure shown in FIG. 6 further includes the following steps.

S616: The SMF selects an EASDF.

S617: The SMF interacts with the EASDF to create a DNS message handling rule on the EASDF.

S618: The SMF interacts with the EASDF to update the DNS message handling rule on the EASDF.

S619: The UE sends DNS query information to the EASDF.

S620: The EASDF sends a notification request message to the SMF.

S621: The SMF sends a notification response message to the EASDF.

Step S616 to step S621 are the same as step S212 to step S217 in FIG. 2. Details are not described herein again.

Further, the SMF determines, based on an APP FQDN, the EAS deployment information, a UE position, the selection weight of the EAS (or the edge computing platform), the load status of the EAS (or the edge computing platform), the service status of the EAS (or the edge computing platform), and the like, information for constructing an ECS option or an address of a local DNS server. The method procedure shown in FIG. 6 further includes the following step.

S622: The SMF determines first information.

For details, refer to the foregoing descriptions of S535. Details are not described herein again.

Specifically, the SMF needs to send, to the EASDF, the information for constructing the ECS option or the address of the local DNS server that is determined based on the first information. The method procedure shown in FIG. 6 further includes the following step.

S623: The SMF interacts with the EASDF to update the DNS message handling rule on the EASDF.

Specifically, this step includes: The SMF sends a DNS context update request message (which may be, for example, Neasdf_DNSContext_Update Request) to the EASDF, where the DNS context update request message includes the information for constructing the ECS option or the address of the local DNS server; and the EASDF sends a DNS context update response message (which may be, for example, Neasdf_DNSContext_Update Response) to the SMF.

Further, the method procedure shown in FIG. 6 further includes the following steps.

S624: The EASDF sends the DNS query information to the DNS server.

S625: The EASDF receives a DNS response message sent by the DNS server.

S626: The EASDF sends a notification request message to the SMF.

S627: The SMF sends a notification response message to the EASDF.

S628: The SMF inserts a UL CL UPF and an L-PSA.

S629: The SMF interacts with the EASDF to update the DNS message handling rule on the EASDF.

S630: The EASDF sends the DNS response message to the UE.

Step S624 to step S630 are the same as step S219 to step S225 in FIG. 2. Details are not described herein again.

Figure 7:
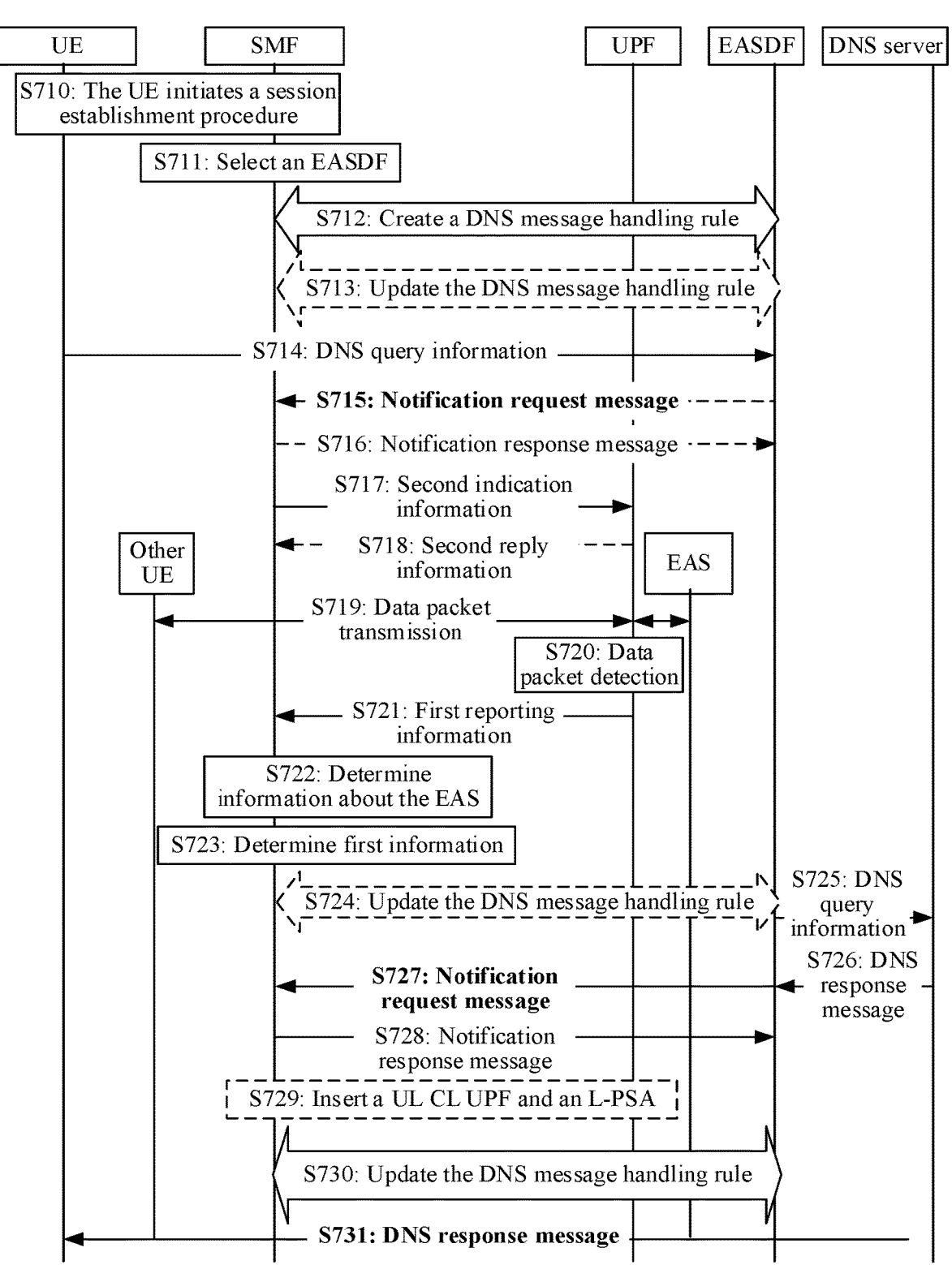
FIG. 7 is a schematic flowchart of another method for discovering an edge application server.

FIG. 7 is a schematic flowchart of another method for discovering an edge application server. The method includes the following steps.

S710: UE initiates a session establishment procedure.

S711: An SMF selects an EASDF.

S712: The SMF interacts with the EASDF to create a DNS message handling rule on the EASDF.

S713: The SMF interacts with the EASDF to update the DNS message handling rule on the EASDF.

S714: The UE sends DNS query information to the EASDF.

S715: The EASDF sends a notification request message to the SMF.

S716: The SMF sends a notification response message to the EASDF.

Step S710 to step S716 are the same as step S211 to step S217 in FIG. 2. Details are not described herein again.

In the method shown in FIG. 7, the SMF needs to determine information about the EAS based on information obtained from a UPF. A method procedure shown in FIG. 7 further includes the following steps.

S717: The SMF sends second indication information to the UPF.

For details, refer to the foregoing descriptions of S513. Details are not described herein again.

S718: The UPF sends second reply information to the SMF.

For details, refer to the foregoing descriptions of S514. Details are not described herein again.

S719: Perform data packet transmission between the UE and the EAS.

Specifically, data packet transmission is performed between the UE and the EAS via the UPF.

Optionally, the EAS is the first EAS in the manner 2 in FIG. 5A, and a data packet is the first data packet in the manner 2 in FIG. 5A.

S720: The UPF performs data packet detection.

S721: The UPF sends first reporting information to the SMF.

S722: The SMF determines information about at least one EAS based on the first reporting information.

Step S720 to step S722 are the same as step S515 to step S517 in FIG. 5A. Details are not described herein again.

Further, the SMF determines, based on an APP FQDN, EAS deployment information, a UE position, a load status of the EAS (or an edge computing platform), a service status of the EAS (or the edge computing platform), and the like, information for constructing an ECS option or an address of a local DNS server. The method procedure shown in FIG. 7 further includes the following step.

S723: The SMF determines first information.

For details, refer to the foregoing descriptions of S535. Details are not described herein again.

It should be noted that, step S717 to step S722 are a process performed for other UE, and step S723 is a process performed for UE that currently performs EAS discovery. After discovering an EAS, the UE that currently performs EAS discovery may further perform step S717 to step S722.

Specifically, the SMF needs to send, to the EASDF, the information for constructing the ECS option or the address of the local DNS server that is determined based on the first information. The method procedure shown in FIG. 7 further includes the following step.

S724: The SMF interacts with the EASDF to update the DNS message handling rule on the EASDF.

Specifically, this step includes: The SMF sends a DNS context update request message (which may be, for example, Neasdf_DNSContext_Update Request) to the EASDF, where the DNS context update request message includes the information for constructing the ECS option or the address of the local DNS server; and the EASDF sends a DNS context update response message (which may be, for example, Neasdf_DNSContext_Update Response) to the SMF.

Further, the method procedure shown in FIG. 7 further includes the following steps.

S725: The EASDF sends the DNS query information to the DNS server.

S726: The EASDF receives a DNS response message sent by the DNS server.

S727: The EASDF sends a notification request message to the SMF.

S728: The SMF sends a notification response message to the EASDF.

S729: The SMF inserts a UL CL UPF and an L-PSA.

S730: The SMF interacts with the EASDF to update the DNS message handling rule on the EASDF.

S731: The EASDF sends the DNS response message to the UE.

Step S725 to step S731 are the same as step S219 to step S225 in FIG. 2. Details are not described herein again.

Figure 8:
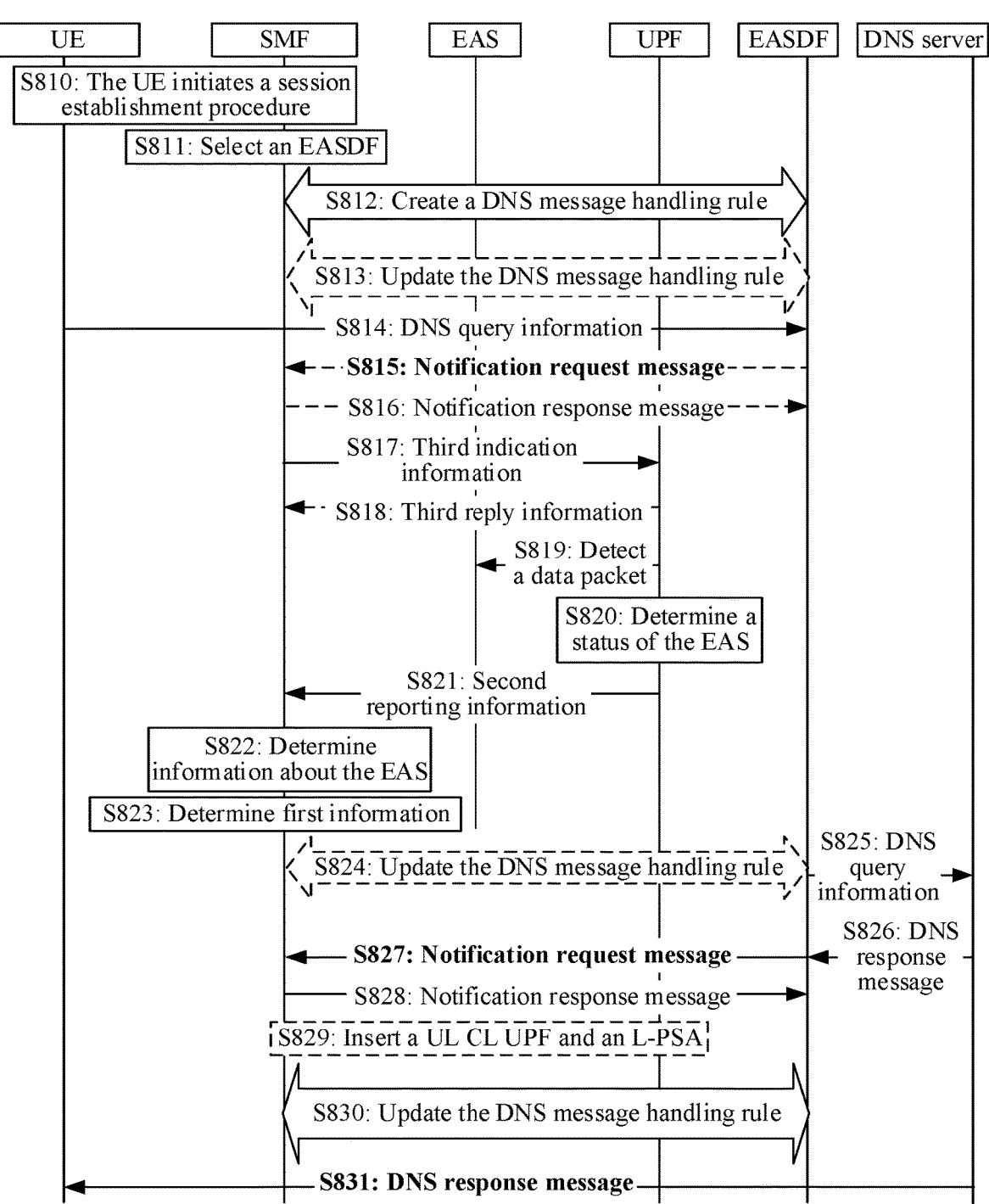
FIG. 8 is a schematic flowchart of still another method for discovering an edge application server.

FIG. 8 is a schematic flowchart of still another method for discovering an edge application server. The method includes the following steps.

S810: UE initiates a session establishment procedure.

S811: An SMF selects an EASDF.

S812: The SMF interacts with the EASDF to create a DNS message handling rule on the EASDF.

S813: The SMF interacts with the EASDF to update the DNS message handling rule on the EASDF.

S814: The UE sends DNS query information to the EASDF.

S815: The EASDF sends a notification request message to the SMF.

S816: The SMF sends a notification response message to the EASDF.

Step S810 to step S816 are the same as step S211 to step S217 in FIG. 2. Details are not described herein again.

In the method shown in FIG. 8, the SMF needs to determine information about the EAS based on information obtained from a UPF. A method procedure shown in FIG. 8 further includes the following steps.

S817: The SMF sends third indication information to the UPF.

For details, refer to the foregoing descriptions of S521. Details are not described herein again.

S818: The UPF sends third reply information to the SMF.

S819: The UPF sends a detection data packet to the EAS.

Optionally, the EAS is the first EAS in the manner 3 in FIG. 5B.

S820: The UPF determines a status of the EAS.

S821: The UPF sends second reporting information to the SMF.

S822: The SMF determines information about at least one EAS based on the second reporting information.

Step S817 to step S822 are the same as step S521 to step S526 in FIG. 5B. Details are not described herein again.

It should be noted that, step S817 to step S822 are a process performed for each EAS.

Further, the SMF determines, based on an APP FQDN, EAS deployment information, a UE position, a load status of the EAS (or an edge computing platform), a service status of the EAS (or the edge computing platform), and the like, information for constructing an ECS option or an address of a local DNS server. The method procedure shown in FIG. 8 further includes the following step.

S823: The SMF determines first information.

For details, refer to the foregoing descriptions of S535. Details are not described herein again.

Specifically, the SMF needs to send, to the EASDF, the information for constructing the ECS option or the address of the local DNS server that is determined based on the first information. The method procedure shown in FIG. 8 further includes the following step.

S824: The SMF interacts with the EASDF to update the DNS message handling rule on the EASDF.

Specifically, this step includes: The SMF sends a DNS context update request message (which may be, for example, Neasdf_DNSContext_Update Request) to the EASDF, where the DNS context update request message includes the information for constructing the ECS option or the address of the local DNS server; and the EASDF sends a DNS context update response message (which may be, for example, Neasdf_DNSContext_Update Response) to the SMF.

Further, the method procedure shown in FIG. 8 further includes the following steps.

S825: The EASDF sends the DNS query information to the DNS server.

S826: The EASDF receives a DNS response message sent by the DNS server.

S827: The EASDF sends a notification request message to the SMF.

S828: The SMF sends a notification response message to the EASDF.

S829: The SMF inserts a UL CL UPF and an L-PSA.

S830: The SMF interacts with the EASDF to update the DNS message handling rule on the EASDF.

S831: The EASDF sends the DNS response message to the UE.

Step S825 to step S831 are the same as step S219 to step S225 in FIG. 2. Details are not described herein again.

Figure 9:
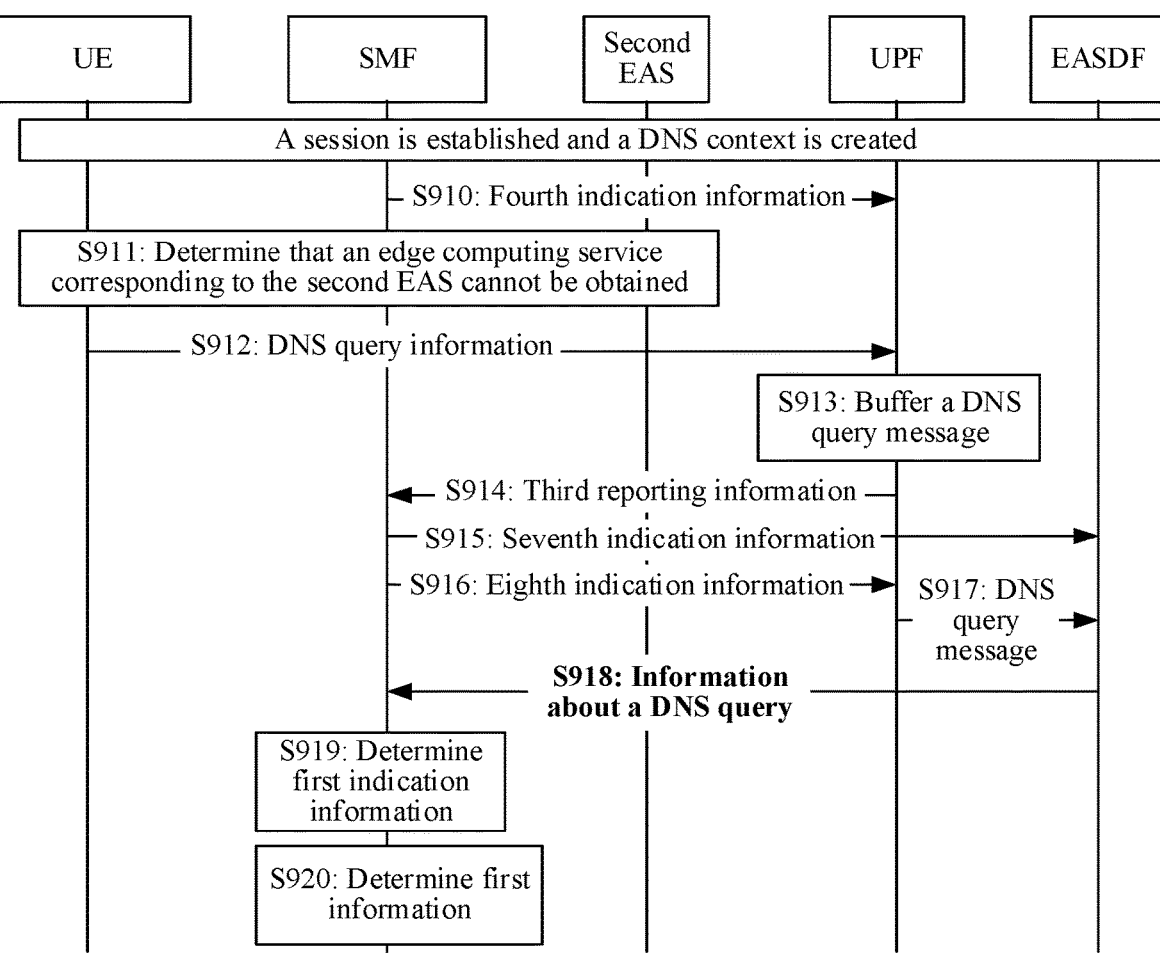
FIG. 9 is a schematic flowchart of still another method for discovering an edge application server.

FIG. 9 is a schematic flowchart of still another method for discovering an edge application server. The method for discovering an edge application server is based on the procedure shown in FIG. 2, and the following modifications are made on the procedure shown in FIG. 2.

In step S223 in the procedure shown in FIG. 2, the UPF is indicated to buffer the DNS query information for the first FQDN from the terminal apparatus that currently needs to perform EAS discovery. Steps before step S223 in FIG. 2 are not described again.

A method procedure shown in FIG. 9 includes the following steps.

S910: An SMF sends fourth indication information to a UPF.

For details, refer to the foregoing descriptions of S530. Details are not described herein again.

S911: UE determines that an edge computing service corresponding to a second EAS cannot be obtained.

It may be understood as that, the UE attempts to obtain the edge computing service based on an EAS IP in a DNS response, and cannot obtain the edge computing service corresponding to the EAS.

S912: The UE re-initiates DNS query information.

S913: The UPF detects the DNS query information, and buffers the DNS query information.

For details, refer to the foregoing descriptions of S531. Details are not described herein again.

S914: The UPF sends third reporting information to the SMF.

For details, refer to the foregoing descriptions of S532. Details are not described herein again.

S915: The SMF sends seventh indication information to an EASDF.

The seventh indication information indicates the EASDF to report, to the SMF, DNS query information whose original IP address is a UE IP address and whose query domain name is a first FQDN.

For example, the SMF updates a DNS message handling rule on the EASDF by using a Neasdf_DNSContext_Update service, to indicate the EASDF to perform the foregoing operations.

S916: The SMF sends eighth indication information to the UPF.

The eighth indication information indicates the UPF to forward the buffered DNS query information to the EASDF.

S917: The UPF sends the DNS query information to the EASDF.

S918: The EASDF sends information about a DNS query to the SMF, or the SMF receives the information about the DNS query from the EASDF.

The information about the DNS query may be a part or all of information included in the foregoing DNS query information.

For example, the EASDF reports the information about the DNS query to the SMF according to the DNS message handling rule by using Neasdf_DNSContext_Notify.

S919: The SMF determines first indication information.

For details, refer to the foregoing descriptions of S533. Details are not described herein again.

Further, the SMF determines, based on an APP FQDN, EAS deployment information, a UE position, and UPF reporting information (for example, an FQDN, an EAS IP (a corresponding EAS IP for inserting a UL CL 1/BP 1), and a DNAI), information for constructing an ECS option or an address of a local DNS server. The method procedure shown in FIG. 9 further includes the following step.

S920: The SMF determines first information.

For details, refer to the foregoing descriptions of S535. Details are not described herein again.

Specifically, the SMF needs to send, to the EASDF, the information for constructing the ECS option or the address of the local DNS server that is determined based on the first information. The method procedure shown in FIG. 9 further includes a subsequent DNS query processing procedure, which is the same as step S218 to step S225 in FIG. 2. Details are not described herein again.

FIG. 10 is a schematic flowchart of still another method for discovering an edge application server. The method for discovering an edge application server is based on the procedure shown in FIG. 2, and the following modifications are made on the procedure shown in FIG. 2.

S1010: UE determines that an edge computing service corresponding to a second EAS cannot be obtained.

It may be understood as that, the UE attempts to obtain the edge computing service based on an EAS IP in a DNS response, and cannot obtain the edge computing service corresponding to the EAS.

S1011: The UE sends first indication information to an SMF.

For details, refer to the foregoing descriptions of S534. Details are not described herein again.

S1012: The SMF sends seventh indication information to an EASDF.

The seventh indication information indicates the EASDF to report, to the SMF, DNS query information whose original IP address is a UE IP address and whose query domain name is a first FQDN.

For example, the SMF updates a DNS message handling rule on the EASDF by using a Neasdf_DNSContext_Update service, to indicate the EASDF to perform the foregoing operations.

Optionally, after the SMF receives the first indication information, the SMF may send first reply information to the UE in response to receiving the first indication information. A method procedure shown in FIG. 5A and FIG. 5B further includes the following steps.

S1013: The SMF sends the first reply information to the UE, or the UE receives the first reply information from the SMF.

Optionally, the SMF sends the first reply information to the UE by using a NAS message.

The first reply information indicates that the UE may re-initiate a DNS query.

In addition, after receiving the first indication information, the SMF may alternatively not send the first reply information, and the UE may directly re-initiate the DNS query.

S1014: The UE resends the DNS query information.

S1015: The EASDF sends information about the DNS query to the SMF, or the SMF receives the information about the DNS query from the EASDF.

The information about the DNS query may be a part or all of information included in the foregoing DNS query information.

For example, the EASDF reports the information about the DNS query to the SMF according to the DNS message handling rule by using Neasdf_DNSContext_Notify.

S1016: The SMF determines a third EAS.

For details, refer to the foregoing descriptions of S535. Details are not described herein again.

Further, the SMF determines, based on an APP FQDN, EAS deployment information, a UE position, information (an FQDN, an EAS IP, a DNAI, or the like) reported by the UE, information for constructing an ECS option or an address of a local DNS server. The method procedure shown in FIG. 10 further includes the following step.

S1017: The SMF determines first information.

For details, refer to the foregoing descriptions of S535. Details are not described herein again.

Specifically, the SMF needs to send, to the EASDF, the information for constructing the ECS option or the address of the local DNS server that is determined based on the first information. The method procedure shown in FIG. 10 further includes a subsequent DNS query processing procedure, which is the same as step S218 to step S225 in FIG. 2. Details are not described herein again.

It should be understood that the specific examples shown in FIG. 6 to FIG. 10 in embodiments of this application are merely intended to help a person skilled in the art better understand embodiments of this application, but are not intended to limit the scope of embodiments of this application. For example, a procedure in a specific embodiment is described by using an EAS discovery procedure as an example. This does not limit a case in which the method for discovering an edge application server provided in this application is applicable only to the EAS discovery procedure. The method is also applicable to another procedure related to determining information for constructing an ECS option or determining an address of a local domain name system DNS server.

It should be further understood that sequence numbers of the foregoing processes do not mean execution sequences. The execution sequences of the processes should be determined based on functions and internal logic of the processes, and should not be construed as any limitation on the implementation processes of embodiments of this application.

It should be further understood that in embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

It should be further understood that in some of the foregoing embodiments, a network element (for example, an AF, a UPF, or an SMF) in an existing network architecture is mainly used as an example for description. It should be understood that, a specific form of the network element is not limited in embodiments of this application. For example, all network elements that can implement a same function in the future are applicable to embodiments of this application.

It may be understood that, in the foregoing method embodiments, methods and operations implemented by a network device (for example, each network element) may alternatively be implemented by a component (for example, a chip or a circuit) that can be used in the network device.

It should be noted that the foregoing describes the methods by using an example in which the "session" in this application is a PDU session and the "user equipment" in this application is UE. During actual application, the PDU session may alternatively be replaced with another session, and the UE may alternatively be replaced with other user equipment. This is not limited in this application.

With reference to FIG. 5A to FIG. 10, the foregoing describes in detail the method for discovering an edge application server provided in embodiments of this application. The foregoing method for discovering an edge application server is mainly described from a perspective of interaction between network elements. It may be understood that, to implement the foregoing functions, each network element includes a corresponding hardware structure and/or software module for executing the functions.

A person skilled in the art may be aware that, with reference to units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
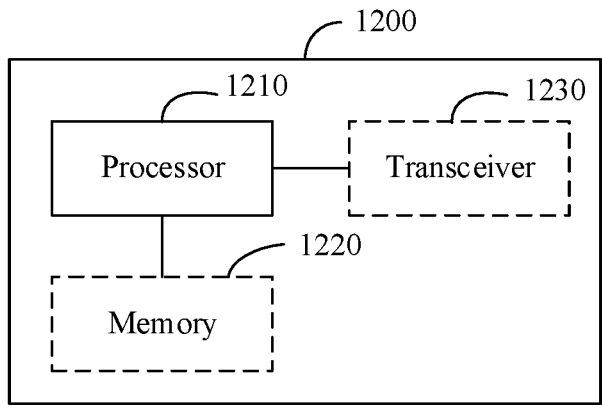
FIG. 12 is another schematic block diagram of an apparatus according to an embodiment of this application.

With reference to FIG. 11 and FIG. 12, the following describes in detail an apparatus for discovering an edge application server provided in embodiments of this application. It should be understood that, descriptions of apparatus embodiments correspond to the descriptions of the method embodiments. Therefore, for content that is not described in detail, refer to the foregoing method embodiments. For brevity, some content is not described again.

In embodiments of this application, a transmitting device or a receiving device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely logical function division. During actual implementation, another division manner may be used. An example in which each functional module is obtained through division based on each corresponding function is used below for description.

FIG. 11 is a schematic block diagram of an apparatus 1100 according to an embodiment of this application. The apparatus 1100 includes a transceiver unit 1110 and a processing unit 1120. The transceiver unit 1110 may implement a corresponding communication function, and the processing unit 1120 is configured to process data. The transceiver unit 1110 may also be referred to as a communication interface or a communication unit.

Optionally, the apparatus 1100 may further include a storage unit, the storage unit may be configured to store instructions and/or data, and the processing unit 1120 may read the instructions and/or the data in the storage unit, so that the apparatus implements the foregoing method embodiments.

The apparatus 1100 may be configured to perform actions performed by the network device (for example, each network element) in the foregoing method embodiments. In this case, the apparatus 1100 may be the network device or a component that can be configured on the network device. The transceiver unit 1110 is configured to perform a receiving and sending related operation on a side of the network device in the foregoing method embodiments. The processing unit 1120 is configured to perform a processing related operation on the side of the network device in the foregoing method embodiments.

In a design, the apparatus 1100 is configured to perform actions performed by the session management function network element in the foregoing method embodiments.

In a possible implementation, the transceiver unit 1110 is configured to obtain first indication information or information about at least one edge application server EAS, where the session management function network element is a network element that serves a session of a terminal apparatus, the information about the EAS indicates at least one of a selection weight of the EAS, a load status of the EAS, or a service status of the EAS, and the first indication information indicates an EAS that cannot serve the terminal apparatus.

The processing unit 1120 is configured to determine first information based on the information about the EAS or the first indication information, where the first information is used to determine information about an extension mechanisms for domain name system client subnet ECS option, or the first information is used to determine an address of a local domain name system DNS server, and the information about the ECS option or the address of the local DNS server is used to determine an EAS that serves the terminal apparatus.

In another possible implementation, the processing unit 1120 is configured to obtain first indication information or information about at least one edge application server EAS.

The processing unit 1120 is configured to determine first information based on the information about the EAS or the first indication information.

The apparatus 1100 may implement the corresponding steps or procedures performed by the session management function network element in the method embodiments according to embodiments of this application. The apparatus 1100 may include a unit configured to perform the method performed by the session management function network element in the method embodiments. In addition, the units in the apparatus 1100 and the foregoing other operations and/or functions are separately used to implement corresponding procedures in the method embodiments of the session management function network element in the method embodiments.

When the apparatus 1100 is configured to perform the method in FIG. 5A and FIG. 5B, the transceiver unit 1110 may be configured to perform sending and receiving steps in the method, for example, steps S512, S511, S513, S514, S516, S518, S520, S521, S522, S525, S527, S529, S530, S532, and S534. The processing unit 1120 may be configured to perform processing steps in the method, for example, steps S517, S526, S533, and S535.

When the apparatus 1100 is configured to perform the method in FIG. 6, the transceiver unit 1110 may be configured to perform sending and receiving steps in the method, for example, steps S613, S614, S615, S611, S612, S617, S618, S620, S621, S623, S626, S627, and S629. The processing unit 1120 may be configured to perform processing steps in the method, for example, steps S616, S622, and S628.

When the apparatus 1100 is configured to perform the method in FIG. 7, the transceiver unit 1110 may be configured to perform sending and receiving steps in the method, for example, steps S712, S713, S715, S716, S717, S718, S721, S724, S727, S728, and S730. The processing unit 1120 may be configured to perform processing steps in the method, for example, steps S711, S722, S723, and S729.

When the apparatus 1100 is configured to perform the method in FIG. 8, the transceiver unit 1110 may be configured to perform sending and receiving steps in the method, for example, steps S812, S813, S815, S816, S817, S818, S821, S824, S827, S828, and S830. The processing unit 1120 may be configured to perform processing steps in the method, for example, steps S811, S822, S823, and S829.

When the apparatus 1100 is configured to perform the method in FIG. 9, the transceiver unit 1110 may be configured to perform sending and receiving steps in the method, for example, steps S910, S914, S915, S916, and S918. The processing unit 1120 may be configured to perform processing steps in the method, for example, steps S919 and S920.

When the apparatus 1100 is configured to perform the method in FIG. 10, the transceiver unit 1110 may be configured to perform sending and receiving steps in the method, for example, steps S1011, S1013, S1012, and S1015. The processing unit 1120 may be configured to perform processing steps in the method, for example, steps S1016 and S1017.

It should be understood that, a specific process in which the units perform the foregoing corresponding steps is described in detail in the foregoing method embodiments, and for brevity, details are not described herein.

In another design, the apparatus 1100 is configured to perform actions performed by the application function network element in the foregoing method embodiments.

In a possible implementation, the processing unit 1120 is configured to determine information about at least one edge application server EAS or information about at least one edge computing platform.

The information about the at least one edge computing platform indicates the information about the at least one EAS, the at least one EAS is deployed on the at least one edge computing platform, and the information about the EAS indicates at least one of a selection weight of the EAS, a load status of the EAS, or a service status of the EAS.

The transceiver unit 1110 is configured to send the information about the at least one EAS to a session management function network element.

The apparatus 1100 may implement the corresponding steps or procedures performed by the application function network element in the method embodiments according to embodiments of this application. The apparatus 1100 may include a unit configured to perform the method performed by the application function network element in the method embodiments. In addition, the units in the apparatus 1100 and the foregoing other operations and/or functions are separately used to implement corresponding procedures in the method embodiments of the application function network element in the method embodiments.

When the apparatus 1100 is configured to perform the method in FIG. 5A and FIG. 5B, the transceiver unit 1110 may be configured to perform sending and receiving steps in the method, for example, steps S512 and S511. The processing unit 1120 may be configured to perform processing steps in the method.

When the apparatus 1100 is configured to perform the method in FIG. 6, the transceiver unit 1110 may be configured to perform sending and receiving steps in the method, for example, steps S613, S614, S615, S611, and S612.

It should be understood that, a specific process in which the units perform the foregoing corresponding steps is described in detail in the foregoing method embodiments, and for brevity, details are not described herein.

In another design, the apparatus 1100 is configured to perform actions performed by the user plane function network element in the foregoing method embodiments.

In a possible implementation, the transceiver unit 1110 is configured to receive second indication information from a session management function network element, where the second indication information indicates the user plane function network element to detect a first data packet, and a destination internet protocol IP address of the first data packet is an IP address of a first edge application server EAS.

The processing unit 1120 is configured to detect the first data packet to obtain a detection result of the first data packet, where the detection result includes access traffic information of the first EAS and/or transmission delay information of the first data packet between the user plane function network element and the first EAS.

The transceiver unit 1110 is configured to send first reporting information to the session management function network element, where the first reporting information includes the detection result of the first data packet, the first reporting information is used to determine information about the first EAS, and the information about the first EAS indicates a load status of the first EAS and/or indicates a service status of the first EAS.

In another possible implementation, the transceiver unit 1110 is configured to receive third indication information from a session management function network element, where the third indication information indicates the user plane function network element to perform network detection to determine a status of a first edge application server EAS.

The transceiver unit 1110 is configured to send a detection data packet to the first EAS.

The processing unit 1120 is configured to determine the status of the first EAS based on a response of the first EAS to the detection data packet.

The transceiver unit 1110 is configured to send second reporting information to the session management function network element, where the second reporting information includes indication information of the status of the first EAS, the second reporting information is used to determine information about the first EAS, and the information about the first EAS indicates a load status of the first EAS and/or indicates a service status of the first EAS.

In still another possible implementation, the transceiver unit 1110 is configured to receive fourth indication information from a session management function network element, where the fourth indication information indicates the user plane function network element to buffer DNS query information for a first fully qualified domain name FQDN from the terminal apparatus.

The processing unit 1120 is configured to buffer the DNS query information.

The transceiver unit 1110 is configured to send third reporting information to the session management function network element, where the third reporting information includes the first FQDN, the third reporting information is used to determine first indication information, and the first indication information indicates a second EAS that cannot serve the terminal apparatus.

The apparatus 1100 may implement the corresponding steps or procedures performed by the user plane function network element in the method embodiments according to embodiments of this application. The apparatus 1100 may include a unit configured to perform the method performed by the user plane function network element in the method embodiments. In addition, the units in the apparatus 1100 and the foregoing other operations and/or functions are separately used to implement corresponding procedures in the method embodiments of the user plane function network element in the method embodiments.

When the apparatus 1100 is configured to perform the method in FIG. 5A and FIG. 5B, the transceiver unit 1110 may be configured to perform sending and receiving steps in the method, for example, steps S513, S514, S516, S521, S522, S525, S530, and S532. The processing unit 1120 may be configured to perform processing steps in the method, for example, steps S515, S524, and S531.

When the apparatus 1100 is configured to perform the method in FIG. 7, the transceiver unit 1110 may be configured to perform sending and receiving steps in the method, for example, steps S717, S718, and S721. The processing unit 1120 may be configured to perform processing steps in the method, for example, step S720.

When the apparatus 1100 is configured to perform the method in FIG. 8, the transceiver unit 1110 may be configured to perform sending and receiving steps in the method, for example, steps S817, S818, S819, and S821. The processing unit 1120 may be configured to perform processing steps in the method, for example, step S820.

When the apparatus 1100 is configured to perform the method in FIG. 9, the transceiver unit 1110 may be configured to perform sending and receiving steps in the method, for example, steps S910, S914, and S916. The processing unit 1120 may be configured to perform processing steps in the method, for example, step S913.

It should be understood that, a specific process in which the units perform the foregoing corresponding steps is described in detail in the foregoing method embodiments, and for brevity, details are not described herein.

In another design, the apparatus 1100 is configured to perform actions performed by the terminal apparatus in the foregoing method embodiments.

In a possible implementation, the processing unit 1120 is configured to determine first indication information, where the first indication information indicates a third EAS that cannot serve the terminal apparatus.

The transceiver unit 1110 is configured to send the first indication information to a session management function network element.

The apparatus 1100 may implement the corresponding steps or procedures performed by the terminal apparatus in the method embodiments according to embodiments of this application. The apparatus 1100 may include a unit configured to perform the method performed by the terminal apparatus in the method embodiments. In addition, the units in the apparatus 1100 and the foregoing other operations and/or functions are separately used to implement corresponding procedures in the method embodiments of the terminal apparatus in the method embodiments.

When the apparatus 1100 is configured to perform the method in FIG. 5A and FIG. 5B, the transceiver unit 1110 may be configured to perform sending and receiving steps in the method, for example, step S534. The processing unit 1120 may be configured to perform processing steps in the method.

When the apparatus 1100 is configured to perform the method in FIG. 6, the transceiver unit 1110 may be configured to perform sending and receiving steps in the method, for example, steps S619 and S630.

When the apparatus 1100 is configured to perform the method in FIG. 7, the transceiver unit 1110 may be configured to perform sending and receiving steps in the method, for example, steps S714 and S731.

When the apparatus 1100 is configured to perform the method in FIG. 8, the transceiver unit 1110 may be configured to perform sending and receiving steps in the method, for example, steps S814 and S831.

When the apparatus 1100 is configured to perform the method in FIG. 9, the transceiver unit 1110 may be configured to perform sending and receiving steps in the method, for example, step S912.

When the apparatus 1100 is configured to perform the method in FIG. 10, the transceiver unit 1110 may be configured to perform sending and receiving steps in the method, for example, steps S1011, S1013, and S1014. The processing unit 1120 may be configured to perform processing steps in the method, for example, step S1010.

The processing unit 1120 in the foregoing embodiment may be implemented by at least one processor or a processor-related circuit. The transceiver unit 1110 may be implemented by using a transceiver or a transceiver-related circuit. The storage unit may be implemented by using at least one memory.

As shown in FIG. 12, an embodiment of this application further provides an apparatus 1200. The apparatus 1200 includes a processor 1210, and may further include one or more memories 1220. The processor 1210 is coupled to the memory 1220. The memory 1220 is configured to store a computer program or instructions and/or data. The processor 1210 is configured to execute the computer program or the instructions and/or the data stored in the memory 1220, so that the method in the foregoing method embodiments is performed. Optionally, the apparatus 1200 includes one or more processors 1210.

Optionally, the memory 1220 may be integrated with the processor 1210, or separately disposed.

Optionally, as shown in FIG. 12, the apparatus 1200 may further include a transceiver 1230, and the transceiver 1230 is configured to receive and/or send a signal. For example, the processor 1210 is configured to control the transceiver 1230 to receive and/or send a signal.

In a solution, the apparatus 1200 is configured to implement operations performed by the network device (for example, each network element) in the foregoing method embodiments.

An embodiment of this application further provides an apparatus 1300. The apparatus 1300 may be a network device or a chip. The apparatus 1300 may be configured to perform operations performed by the network device (for example, each network element) in the foregoing method embodiments.

Figure 13:
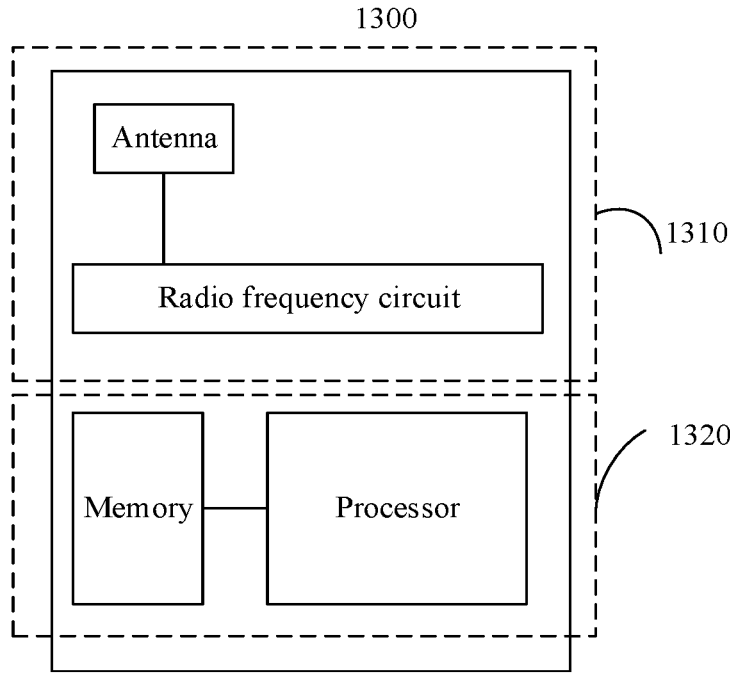
FIG. 13 is a schematic diagram of a structure of an apparatus according to an embodiment of this application.

FIG. 13 is a schematic diagram of a simplified structure. An apparatus 1300 includes a part 1310 and a part 1320. The part 1310 is mainly configured to: send and receive a radio frequency signal, and perform conversion between the radio frequency signal and a baseband signal. The part 1320 is mainly configured to: perform baseband processing, control a base station, and the like. The part 1310 may be usually referred to as a transceiver unit, a transceiver machine, a transceiver circuit, a transceiver, or the like. The part 1320 is usually a control center of the base station, may be usually referred to as a processing unit, and is configured to control the base station to perform a processing operation on a side of the receiving device in the foregoing method embodiments.

The transceiver unit in the part 1310 may also be referred to as a transceiver machine, a transceiver, or the like. The transceiver unit includes an antenna and a radio frequency circuit. The radio frequency circuit is mainly configured to perform radio frequency processing. Optionally, a component for implementing a receiving function in the part 1310 may be considered as a receiving unit, and a component for implementing a sending function may be considered as a sending unit. That is, the part 1310 includes the receiving unit and the sending unit. The receiving unit may also be referred to as a receiver machine, a receiver, a receiver circuit, or the like. The sending unit may also be referred to as a transmitter machine, a transmitter, a transmitter circuit, or the like.

The part 1320 may include one or more boards, and each board may include one or more processors and one or more memories. The processor is configured to read and execute a program in the memory to implement a baseband processing function and control the base station. If there are a plurality of boards, the boards may be interconnected with each other to enhance a processing capability. In an optional implementation, a plurality of boards may share one or more processors, a plurality of boards share one or more memories, or a plurality of boards simultaneously share one or more processors.

It should be understood that, FIG. 13 is merely an example instead of a limitation. The network device including the transceiver unit and the processing unit may not rely on the structure shown in FIG. 13.

When the apparatus 1300 is a chip, the chip includes a transceiver unit and a processing unit. The transceiver unit may be an input/output circuit or a communication interface. The processing unit is a processor, a microprocessor, or an integrated circuit integrated on the chip. Certainly, the apparatus 1300 may alternatively be a chip system or a processing system, so that a device in which the apparatus 1300 is installed can implement the method and the functions in embodiments of this application. For example, the processing unit 1320 may be a chip system or a processing circuit in a processing system, to control a device in which the chip system or the processing system is installed. The processing unit may further be coupled to a storage unit, and invoke instructions in the storage unit, so that the device can implement the method and the functions in embodiments of this application. The transceiver unit 1310 may be an input/output circuit in the chip system or the processing system, to output information processed by the chip system, or input to-be-processed data or signaling information into the chip system for processing.

An embodiment of this application further provides a computer-readable storage medium. The computer-readable storage medium stores computer instructions used to implement the method performed by the network device (for example, each network element) in the foregoing method embodiments.

For example, when a computer program is executed by a computer, the computer is enabled to implement the method performed by the network device in the foregoing method embodiments.

An embodiment of this application further provides a computer program product including instructions. When the instructions are executed by a computer, the computer is enabled to implement the method performed by the network device (for example, each network element) in the foregoing method embodiments.

An embodiment of this application further provides a communication system. The communication system includes the network device (for example, each network element) in the foregoing embodiments, for example, includes an SMF and an AF.

For explanations and beneficial effects of related content of any one of the apparatuses provided above, refer to the corresponding method embodiment provided above. Details are not described herein again.

It should be understood that, the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that, the memory mentioned in embodiments of this application may be a volatile memory and/or a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. By way of example but not limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate or a transistor logic device, or a discrete hardware component, the memory (storage module) may be integrated into the processor.

It should be further noted that, the memory described in this specification is intended to include, but is not limited to, these memories and any other memory of a suitable type.

A person of ordinary skill in the art may be aware that, in combination with the examples described in embodiments disclosed in this specification, units and methods can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to implement the solutions provided in this application.

In addition, functional units in embodiments of this application may be integrated into one processing unit, each of the units may exist alone physically, or two or more units may be integrated into one unit.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of this application are completely or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. For example, the usable medium may include but is not limited to any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for discovering an edge application server, comprising:
   obtaining, by a session management function network element serving a terminal apparatus, a selection weight of a data network access identifier corresponding to an edge application, wherein the selection weight indicates a selection probability of the data network access identifier; determining, by the session management function network element, first information based on the selection weight of the data network access identifier;
   determining, by the session management function network element and based on the first information, information about an extension mechanisms for domain name system client subnet option or an address of a local domain name system server; and
   sending, by the session management function to an edge application server discovery function network element such that the edge application server discovery function network element can receive, the information about the extension mechanisms for domain name system client subnet option or the address of the local domain name system server, wherein the information about the extension mechanisms for domain name system client subnet option or the address of the local domain name system server is used to determine an edge application server that serves the terminal apparatus.

2. The method of claim 1, wherein the obtaining, by the session management function network element, the selection weight of the data network access identifier corresponding to the edge application comprises: receiving, by the session management function network element, the selection weight of the data network access identifier from an application function network element.

3. The method of claim 2, the method further comprising: determining, by the application function network element, the selection weight of the data network access identifier; and sending, by the application function network element, the selection weight of the data network access identifier to the session management function network element.

4. The method of claim 1, the method further comprising: sending, by the session management function network element, subscription information or request information to the application function network element, wherein the subscription information or the request information is used to obtain the selection weight of the data network access identifier.

5. The method of claim 1, further comprising:
   determining, by an application function network element, the selection weight of the data network access identifier corresponding to the edge application; and
   sending, by the application function network element, the selection weight of the data network access identifier to the session management function network element.

6. The method of claim 5, the method further comprising: receiving, by the application function network element, subscription information or request information from the session management function network element, wherein the subscription information or the request information is used to obtain the selection weight of the data network access identifier.

7. The method of claim 1, the method further comprising: receiving, by the edge application server discovery function network element, the information about the extension mechanisms for domain name system client subnet option or the address of the local domain name system server.

8. An apparatus, comprising:
   at least one processor; and
   at least one memory coupled to the at least one processor and storing programming instructions that, when executed by the at least one processor, cause the apparatus to:
   obtain a selection weight of a data network access identifier corresponding to an edge application, wherein the selection weight indicates a selection probability of the data network access identifier;
   determine first information based on the selection weight of the data network access identifier;
   determine, by the session management function network element and based on the first information, information about an extension mechanisms for domain name system client subnet option or an address of a local domain name system server; and
   send, by the session management function to an edge application server discovery function network element such that the edge application server discovery function network element can receive, the information about the extension mechanisms for domain name system client subnet option or the address of the local domain name system server, wherein the information about the extension mechanisms for domain name system client subnet option or the address of the local domain name system server is used to determine an edge application server that serves the terminal apparatus.

9. The apparatus of claim 8, wherein the apparatus is caused to obtain the selection weight of the data network access identifier by receiving the selection weight of the data network access identifier from an application function network element.

10. The apparatus of claim 8, wherein the apparatus is further caused to: send subscription information or request information to the application function network element, wherein the subscription information or the request information is used to obtain the selection weight of the data network access identifier.

11. A system comprising: a session management function network element and an edge application server discovery function network element, wherein the session management function network element is configured to:

obtain a selection weight of a data network access identifier corresponding to an edge application, wherein the selection weight indicates a selection probability of the data network access identifier;

determine first information based on the selection weight of the data network access identifier;

determine, based on the first information, information about an extension mechanisms for domain name system client subnet option or an address of a local domain name system server; and send, to an edge application server discovery function network element, the information about the extension mechanisms for domain name system client subnet option or the address of the local domain name system server, wherein the information about the extension mechanisms for domain name system client subnet option or the address of the local domain name system server is used to determine an edge application server that serves the terminal apparatus;

wherein the edge application server discovery function network element is configured to receive the information about the extension mechanisms for domain name system client subnet option or the address of the local domain name system server.

12. The system according to claim 11, further comprising: an application function network element configured to:

determine the selection weight of the data network access identifier; and send the selection weight of the data network access identifier to the session management function network element.

\* \* \* \* \*